(12) United States Patent
Haering et al.

(10) Patent No.: US 7,714,038 B2
(45) Date of Patent: May 11, 2010

(54) MODIFIED POLYOLEFIN WAXES

(75) Inventors: Dietmar Haering, Schriesheim (DE); Bernhard Hauer, Fussgoenheim (DE); Thomas Pfeiffer, Boehl-Iggelheim (DE); Andreas Fechtenkoetter, Ludwigshafen (DE); Harald Larbig, Rosenheim (DE); Erich Beck, Ladenburg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 115 days.

(21) Appl. No.: 11/817,509

(22) PCT Filed: Mar. 2, 2006

(86) PCT No.: PCT/EP2006/060389

§ 371 (c)(1),
(2), (4) Date: Aug. 31, 2007

(87) PCT Pub. No.: WO2006/092425

PCT Pub. Date: Sep. 8, 2006

(65) Prior Publication Data

US 2008/0249204 A1 Oct. 9, 2008

(30) Foreign Application Priority Data

Mar. 2, 2005 (DE) .................. 10 2005 010 109

(51) Int. Cl.
*C08F 2/46* (2006.01)
*C08J 3/28* (2006.01)
*C08F 2/50* (2006.01)

(52) U.S. Cl. .............. 522/182; 522/178; 522/113; 522/114; 522/120; 522/134; 522/135; 522/144; 522/150; 522/153; 522/157; 522/158; 522/159; 522/161; 522/184; 522/186; 522/189; 526/319; 526/320; 526/327; 526/328; 526/328.5; 526/329; 526/332; 526/333; 526/303.1; 526/307.4; 526/307.7; 526/307.8; 525/242; 525/286; 525/301; 525/303; 525/309; 525/310; 525/326.5; 525/327.3; 525/327.7; 525/328.8; 524/851; 524/878; 524/700; 524/704; 524/800; 524/804; 524/849; 528/271; 528/272; 528/274

(58) Field of Classification Search .................. 522/178, 522/182, 113, 114, 120, 134, 135, 144, 150, 522/153, 157, 158, 159, 161, 184, 186, 189; 526/319, 320, 327, 328, 328.5, 329, 332, 526/333, 303.1, 307.4, 307.7, 307.8; 525/242, 525/286, 29, 301, 303, 309, 310, 326.5, 327.3, 525/327.7, 328.8, 330.1, 330, 330.6, 330.7, 525/333.1, 333.2, 333.3; 524/700, 704, 800, 524/804, 849, 851, 878; 528/271, 272, 274
See application file for complete search history.

(56) References Cited

U.S. PATENT DOCUMENTS

| 2002/0137857 A1* | 9/2002 | Lange et al. .................. 526/64 |
| 2004/0134604 A1* | 7/2004 | Oxman et al. ............ 156/275.5 |
| 2006/0148975 A1* | 7/2006 | Rink et al. .................. 524/556 |
| 2007/0032570 A1* | 2/2007 | Sato et al. .................. 523/160 |
| 2007/0103525 A1* | 5/2007 | Yamamoto et al. .......... 347/100 |

FOREIGN PATENT DOCUMENTS

| DE | 196 18 720 | 11/1996 |
| DE | 198 26 712 | 12/1999 |
| DE | 199 13 353 | 9/2000 |
| DE | 199 41 136 | 3/2001 |
| DE | 199 57 900 | 6/2001 |
| DE | 10 63 175 | 6/2002 |
| EP | 0 007 508 | 2/1980 |
| EP | 0 057 474 | 8/1982 |
| EP | 0 092 269 | 10/1983 |
| EP | 0479611 | * 10/1991 |
| EP | 0 479 611 | 4/1992 |
| EP | 0 495 751 | 7/1992 |
| EP | 0 615 980 | 9/1994 |
| EP | 0 675 141 | 10/1995 |
| EP | 0 738 740 | 10/1996 |
| EP | 0 813 550 | 12/1997 |
| EP | 0 999 229 | 5/2000 |
| EP | 1 044 991 | 10/2000 |
| EP | 1 207 171 | 5/2002 |
| EP | 1 366 087 | 12/2003 |
| WO | 98 33761 | 8/1998 |
| WO | 01 23484 | 4/2001 |
| WO | 03 042227 | 5/2003 |
| WO | 2004 042069 | 5/2004 |

OTHER PUBLICATIONS

Ekman, K. B.; Nasman, J. H.; Sjostrom, H. Preparation of ethylene copolymers containing pendant unsaturation for radiation crosslinking. J. Applied Polymer Science 1993, v. 48, pp. 167-179.*

(Continued)

*Primary Examiner*—Sanza L McClendon
(74) *Attorney, Agent, or Firm*—Oblon, Spivak, McClelland, Maier & Neustadt, L.L.P.

(57) ABSTRACT

Polyolefin waxes bearing (meth)acrylate groups, process for preparing them and their use.

20 Claims, No Drawings

OTHER PUBLICATIONS

Ekman, K. B. et al., "Preparation of Ethylene Copolymers Containing Pendant Unsaturation for Radiation Crosslinking", Journal of Applied Polymers Science, vol. 48, pp. 167-179, 1993.

De Goede, A.T.J.W. et al., "Selective Lipase-catalyzed Esterification of Alkyl Glycoside", Biocatalysis, vol. 9, pp. 145-155, 1994.

Hajjar, A. B. et al., "Preparation of Monomeric Acrylic Ester Intermediates Using Lipase Catalysed Transesterifications in Organic Solvents", Biotechnology Letters, vol. 12, No. 11, pp. 825-830, 1990.

Ullmann's Encyclopedia of Industrial Chemistry, 5. Edition, Keywork: "Waxes" Bd. vol. A 28, pp. 146-162, Verlag Chemie Weinheim, 1996.

Billet, Reinhard,"Verdampfertechnik", HTB-Edition, Bibliographisches Institut Mannheim, pp. 53-124, 1965.

"Advances in Polymer Science", Springer Edition, vol. 14, pp. 51-86, 1974.

Dietliker, K K., "Chemistry & Technology of UV & EB Formulation for Coatings, Inks & Paints, Photoinitiators for Free Radical and Cationic Polymerisation", P. K. T. Oldring, vol. 3, pp. 115-298 and 363-366.

Wiley Sons, "Polymer Handbook", 2 Edition., pp. II-1 to II-43.

Houben-Weyl, Methoden der Organischen Chemie, Band XIV/1, Macromoleculare Stoffe, Georg Thueme Verlag, Stuttgart, pp. 411-420, 1969.

Houben-Weyl, Methoden der Organischen Chemie, Band XIV/1. Macromoleculare Stoffe, Georg Thueme Verlag, Stuttgart, pp. 192-208, 1969.

Kumar et al, J. Am. Chem. Soc., vol. 124, No. 9, 2002, pp. 1850-1851.

* cited by examiner

MODIFIED POLYOLEFIN WAXES

CROSS REFERENCE TO RELATED APPLICATION

This application is a 371 of PCT/EP06/060389, filed on Mar. 2, 2006, and claims priority to German Patent Application No. DE 102005010109.7, filed on Mar. 2, 2005.

Description

The present invention relates to polyolefin waxes bearing (meth)acrylate groups, a process for preparing them and their use.

Polyolefin waxes and among these polyethylene waxes in particular have been known for a long time. These are essentially linear, hydrophobic polymers which usually bear no functional groups. However, functionalization of such polyolefin waxes is useful for obtaining the desired properties.

Functionalization can, for example, be effected by copolymerization of a comonomer which bears an appropriate functional group, or by subsequent modification of the polyolefin waxes, for example by graft polymerization with monomers bearing functional groups.

The present invention relates to polyolefin waxes which bear (meth)acrylate groups and are to be used, for example, for crosslinking. It is not possible to obtain such polyolefin waxes by copolymerization or subsequent grafting, since the parent monomers would bear at least two polymerizable groups and would thus crosslink the polyolefins.

In J. Appl. Polym. Sc., 1993 (48), 167-179, K. B. Ekman, J. J. Näsman and H. Sjöström describe the subsequent modification of ethylene-acrylic acid copolymers with glycidyl methacrylate, of ethylene-hydroxyethyl methacrylate copolymers with isocyanates having double bonds and of ethylene-vinyl alcohol copolymers with acrylic acid.

A disadvantage of the modification method reported there is that despite the drastic reaction conditions (temperature from 190 to 200° C.) it proceeds with only low yields (not more than 33% in the reaction with glycidyl methacrylate and not more than 13% in the reaction with acrylic acid). However, such high reaction temperatures incur the risk that the acrylate groups will polymerize or at least lead to strongly colored products.

WO 02/85963 describes the possibility of modifying polyolefins having particular enthalpies of fusion by grafting with α,β-unsaturated carboxylic acid derivatives.

Within long lists, mention is made of, inter alia, graft modification with maleic anhydride or hydroxyalkyl acrylate. However, the examples explicitly disclose only graft modification with maleic anhydride, with the anhydride being opened by means of hydroxyalkyl acrylate in a subsequent step.

This results in two disadvantages, firstly, the modification requires two steps starting from the polyolefin, initially the grafting reaction with maleic anhydride and then the opening of the anhydride by means of hydroxyalkyl acrylate, and secondly one carboxylate group of the anhydride remains unmodified after the reaction of the anhydride with the hydroxyalkyl acrylate and represents a hydrophilic group. However, since hydrophobic properties are usually desired in the case of polyolefin waxes, unavoidable formation of a hydrophilic group impairs the desired hydrophobic properties of the product.

(Meth)acrylic esters are usually prepared by acid- or base-catalyzed esterification of (meth)acrylic acid or transesterification of other (meth)acrylic esters with alcohols.

The base-catalyzed transesterification or other syntheses often result in formation of complex and sometimes colored product mixtures. To remove colorations and unreacted reactants, the product mixtures have to be worked up by means of complicated alkaline scrubs.

The preparation of (meth)acrylic esters by enzymatic esterification or transesterification is known.

In *J. Am. Chem. Soc.* 2002, 124, 1850-1851, Kumar and Gross describe the lipase-catalyzed reaction of isopropylidene-protected sugars with vinyl methacrylate. Complete reaction is achieved by means of the specific starting material vinyl methacrylate, since vinyl alcohol liberated is removed from the reaction equilibrium as acetaldehyde. A disadvantage of this process is that vinyl methacrylate as specific monomer (activated acrylate) is expensive and is available commercially only in small amounts.

In *Biocatalysis,* 1994, 9, 145-155, A. T. J. W. de Goede et al. describe the transesterification of α-O-octyl-glucoside with ethyl acrylate in the presence of lipases to form the 6-O-acrylic ester. A disadvantage of this process is that it is restricted to glucosides and glycosidic bonds and is sensitive to steric influences in the glucoside. In addition, more highly acrylated products have been obtained as a result of unselective secondary reactions.

EP-A1 999 229 describes the enzymatic esterification and transesterification of polyoxyalkylenes with (meth)acrylic acid and (meth)acrylic esters.

WO 03/042227 discloses the lipase-catalyzed transesterification of alkyl acrylates with sugars.

In *Biotechnol. Lett.* 1990, 12, 825-830, Hajjar et al. describe the enzymatic transesterification of cyclic and open-chain alkane diols with ethyl acrylate using a lipase from *Chromobacterium viscosum*. The reactions proceed at an 18-fold molar excess of the alkyl acrylate over the diol in a solvent-free system. Mixtures of monoacrylates and diacrylates are formed.

WO 2004/42069 describes the enzymatic esterification or transesterification of polyacrylates bearing hydroxyl groups with (meth)acrylic acid or (meth)acrylic esters.

However, compared to polyolefin waxes, polyacrylates are strongly hydrophilic polymers, so that it cannot be expected that such an enzymatic reaction on hydrophilic polymers can readily be applied to hydrophobic polymers, since enzymes have a very high substrate specificity and also enantioselectivity, regioselectivity or chemoselectivity.

It was an object of the present invention to modify polyolefin waxes with polymerizable groups so that they can be crosslinked while retaining the hydrophobic properties.

This object was achieved by (meth)acrylated polyolefin waxes comprising as formal, copolymerized formulative components a) at least one olefin without further functional groups,
b1) at least one alkenyloxyalkyl (meth)acrylate and/or allyloxyalkyl (meth)acrylate and/or
b2) at least one (meth)acryloyloxyalkyl (meth)acrylate and/or (meth)acryloyloxyalkyl (meth)acrylamide and
c) if appropriate, at least one monomer which is different from a), b1) and b2) and bears at least one functional group, in each case in polymerized form.

Here, "formal" means that the comonomers concerned, in particular the monomers b1) and b2) bearing two polymerizable groups, are not necessarily used in the form indicated in the copolymerization, but are to be thought of as being incorporated into the copolymer by imagined abstraction. This means, in particular in the case of the monomers b1) and b2), that only one of the two polymerizable groups is actually incorporated into the copolymer and the other polymerizable group remains unchanged in the polymer, with in the case of monomer b1) the copolymerizable (meth)acrylate group remaining unchanged.

A further object of the present invention was to provide a process by means of which polyolefin waxes can be modified with polymerizable groups in high conversions and high selectivities. The synthesis should proceed under mild conditions, so that products having a low color number and a high purity result. In addition, the use of activated (meth)acrylic acid derivatives, for example monooximes or vinyl (meth)acrylate, should be dispensed with.

The apparently simple solution of using a compound having two polymerizable groups as comonomer would lead to crosslinking and thus to a large increase in the molar mass.

The object was achieved by a process for preparing (meth)acrylated polyolefin waxes, in which polyolefin waxes bearing hydroxyalkyl groups are esterified with (meth)acrylic acid or transesterified with (meth)acrylic esters.

The process of the invention makes it possible to prepare (meth)acrylated polyolefin waxes having good color numbers in a good chemical and space-time yield and under mild conditions using simple starting materials, namely (meth)acrylic acid and (meth)acrylic esters.

The use of activated (meth)acrylic acid derivatives, e.g. vinyl (meth)acrylate, is not necessary.

In the present text, the expression (meth)acrylic acid refers to methacrylic acid and acrylic acid, preferably acrylic acid.

The monomers a) are at least one olefin without further functional groups, preferably an olefin having precisely one double bond, particularly preferably an α-olefin, very particularly preferably ethylene.

The olefins a) are preferably pure hydrocarbons without further heteroatoms.

Examples of olefins are ethylene, propylene, 1-butene, 2-butene, isobutene, 1-pentene, 2-pentene, 1-hexene, 1-octene, polyisobutenes having a number average molecular weight $M_n$ of from 100 to 1000 dalton, cyclopentene, cyclohexene, butadiene, isoprene and styrene.

Examples of α-olefins are olefins of the formula (I)

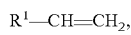

where $R^1$ is hydrogen or $C_1$-$C_{18}$-alkyl which can optionally be interrupted by one or more oxygen and/or sulfur atoms and/or one or more substituted or unsubstituted imino groups, preferably hydrogen or $C_1$-$C_4$-alkyl, particularly preferably hydrogen.

Preferred α-olefins are ethylene, propylene, 1-butene, isobutene, 1-pentene, 1-hexene and 1-octene, preferably ethylene, propylene, isobutene, particularly preferably ethylene or propylene, very particularly preferably ethylene.

The monomers b1) are at least one alkenyloxyalkyl (meth)acrylate and/or allyloxyalkyl (meth)acrylate, preferably at least one alkenyloxyalkyl (meth)acrylate.

These are, for example, compounds of the formula (II)

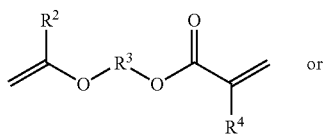

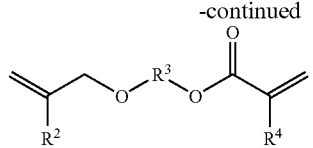

where $R^2$ and $R^4$ are each, independently of one another, hydrogen or methyl and $R^3$ is optionally aryl-, alkyl-, aryloxy-, alkyloxy-, heteroatom- and/or heterocycle-substituted $C_2$-$C_{20}$-alkylene, $C_5$-$C_{12}$-cycloalkylene or $C_6$-$C_{12}$-arylene or $C_2$-$C_{20}$-alkylene interrupted by one or more oxygen and/or sulfur atoms and/or one or more substituted or unsubstituted imino groups and/or one or more cycloalkyl, —(CO)—, —O(CO)O—, —(NH)(CO)O—, —O(CO)(NH)—, —O(CO)— or —(CO)O— groups.

The monomers b2) are at least one (meth)acryloyloxyalkyl (meth)acrylate or (meth)acryloyloxyalkyl(meth)acrylamide. Preference is given to (meth)acryloyloxyalkyl (meth)acrylates.

Examples of (meth)acryloyloxyalkyl (meth)acrylates are compounds of the formula (III)

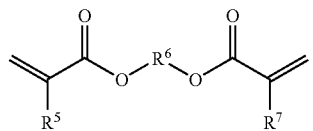

and examples of (meth)acryloyloxyalkyl(meth)acrylamides are compounds of the formula (IIIa)

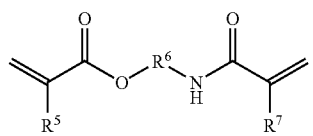

where $R^5$ and $R^7$ are each, independently of one another, hydrogen or methyl and $R^6$ is optionally aryl-, alkyl-, aryloxy-, alkyloxy-, heteroatom- and/or heterocycle-substituted $C_1$-$C_{20}$-alkylene, $C_5$-$C_{12}$-cycloalkylene or $C_6$-$C_{12}$-arylene or $C_2$-$C_{20}$-alkylene interrupted by one or more oxygen and/or sulfur atoms and/or one or more substituted or unsubstituted imino groups and/or one or more cycloalkyl, —(CO)—, —O(CO)O—, —(NH)(CO)O—, —O(CO)(NH)—, —O(CO)— or —(CO)O— groups.

Monomers c) are, if appropriate, at least one monomer which is different from a), b1) and b2) and bears at least one functional group.

In these monomers, functional groups are groups of atoms which comprise atoms other than carbon or hydrogen. Examples are hydroxy, unsubstituted, monosubstituted or disubstituted amino, mercapto, ether, carboxyl, carboxylic anhydride, sulfonic acid, phosphoric acid, phosphonic acid, carboxamide, carboxylic ester, carboxylic anhydride, sulfonic ester, phosphoric ester, phosphonic ester or nitrile groups. Preference is given to hydroxy, amino, ether, carboxyl and carboxylic ester groups, and particular preference is given to ether, carboxyl and carboxylic ester groups.

As monomers c), mention may be made of, for example, $C_1$-$C_{20}$-alkyl (meth)acrylates, vinyl esters of carboxylic acids comprising up to 20 carbon atoms, ethylenically unsaturated nitriles, vinyl ethers of alcohols comprising from 1 to 10 carbon atoms and α,β-unsaturated carboxylic acids and anhydrides thereof.

As acryl (meth)acrylates, preference is given to those having a $C_1$-$C_{10}$-alkyl radical, preferably methyl methacrylate, methyl acrylate, n-butyl acylate, ethyl acrylate and 2-ethylhexyl acrylate.

In particular, mixtures of alkyl (meth)acrylates are also suitable.

Vinyl esters of carboxylic acids having from 1 to 20 carbon atoms are preferably vinyl laurate, vinyl stearate, vinyl propionate and vinyl acetate.

α,β-Unsaturated carboxylic acids and anhydrides thereof can be, for example, acrylic acid, methacrylic acid, fumaric acid, crotonic acid, itaconic acid, maleic acid or maleic anhydride, preferably acrylic acid.

Examples of nitriles are acrylonitrile and methacrylonitrile.

Suitable vinyl ethers are, for example vinyl methyl ether, vinyl isobutyl ether, vinyl hexyl ether and vinyl octyl ether.

N-Vinylformamide, N-vinylpyrrolidone and N-vinylcaprolactam can also be used.

In the above definitions, optionally aryl-, alkyl-, aryloxy-, alkyloxy-, heteroatom- and/or heterocycle-substituted $C_2$-$C_{20}$-alkylene is, for example, 1,1-ethylene, 1,2-ethylene, 1,1-propylene, 1,2-propylene, 1,3-propylene, 1,1-butylene, 1,2-butylene, 1,3-butylene, 1,4-butylene, 1,6-hexylene, 2-methyl-1,3-propylene, 2-ethyl-1,3-propylene, 2,2-dimethyl-1,3-propylene, 2,2-dimethyl-1,4-butylene, optionally aryl-, alkyl-, aryloxy-, alkyloxy-, heteroatom- and/or heterocycle-substituted $C_1$-$C_{20}$-alkylene additionally comprises methylene, optionally aryl-, alkyl-, aryloxy-, alkyloxy-, heteroatom- and/or heterocycle-substituted $C_5$-$C_{12}$-cycloalkylene is, for example cyclopropylene, cyclopentylene, cyclohexylene, cyclooctylene, cyclododecylene, optionally aryl-, alkyl-, aryloxy-, alkyloxy-, heteroatom- and/or heterocycle-substituted $C_2$-$C_{20}$-alkylene interrupted by one or more oxygen and/or sulfur atoms and/or one or more substituted or unsubstituted imino groups and/or by one or more cycloalkyl, —(CO)—, —O(CO)O—, —(NH)(CO)O—, —O(CO)(NH)—, —O(CO)— or —(CO)O— groups is, for example, 3-oxa-1,5-pentylene, 3,6-dioxa-1,8-octylene, 3,6,9-trioxa-1,11-undecylene, 4-oxa-1,7-heptylene, 4,8-dioxa-1,11-undecylene, 4,8,12-trioxa-1,15-pentadecylene, 5-oxa-1,9-nonylene, 5,10-dioxa-1,14-tetradecylene, 3-oxa-2,5-dimethyl-1,5-pentylene, 3,6-dioxa-2,5,8-trimethyl-1,8-octylene, 3-oxa-1,4-dimethyl-1,5-pentylene and 3,6-dioxa-1,4,7-trimethyl-1,8-octylene, optionally aryl-, alkyl-, aryloxy-, alkyloxy-, heteroatom- and/or heterocycle-substituted $C_6$-$C_{12}$-arylene is, for example, 1,2-, 1,3- or 1,4-phenylene, 4,4'-biphenylene, tolylene or xylylene and $C_1$-$C_{18}$-alkyl or $C_2$-$C_{18}$-alkyl which can optionally be interrupted by one or more oxygen and/or sulfur atoms and/or one or more substituted or unsubstituted imino groups is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolyl-methyl, 1-(p-butylphenyl)ethyl, p-chlorobenzyl, 2,4-dichlorobenzyl, p-methoxybenzyl, methoxybenzyl, 2-cyanoethyl, 2-cyanopropyl, 2-methoxycarbonylethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, and preferably methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butyl-phenyl)ethyl, p-chlorobenzyl, 2,4-dichlorobenzyl, 2-cyanoethyl, 2-cyanopropyl, chloromethyl, 2-chloroethyl, trichloromethyl, trifluoromethyl, 1,1-dimethyl-2-chloroethyl and 2,2,2-trifluoroethyl.

Examples of $R^1$ are hydrogen, methyl, ethyl, n-propyl, isopropyl, n-butyl, sec-butyl, tert-butyl, n-pentyl, n-hexyl, n-octyl, n-decyl and n-dodecyl.

Preference is given to hydrogen, methyl, ethyl, n-propyl, n-butyl, n-pentyl and n-hexyl, particularly preferably methyl, ethyl, n-butyl and n-hexyl, and very particular preference is given to methyl.

Examples of $R^2$ are hydrogen and methyl, preferably hydrogen.

Examples of $R^3$ are 1,2-ethylene, 1,2-propylene, 1,3-propylene, 1,2-butylene, 1,3-butylene, 1,4-butylene, 1,6-hexylene, 1,8-octylene, 1,10-decylene, 1,12-dodecylene, 2-methyl-1,3-propylene, 2-ethyl-1,3-propylene, 2,2-dimethyl-1,3-propylene, 2,2-dimethyl-1,4-butylene, 3-oxa-1,5-pentylene, 3,6-dioxa-1,8-octylene, 3,6,9-trioxa-1,1-undecylene, 4-oxa-1,7-heptylene, 4,8-dioxa-1,11-undecylene, 4,8,12-trioxa-1,15-pentadecylene, 5-oxa-1,9-nonylene, 5,10-dioxa-1,14-tetradecylene, 3-oxa-2,5-dimethyl-1,5-pentylene, 3,6-dioxa-2,5,8-trimethyl-1,8-octylene, 3-oxa-1,4-dimethyl-1,5-pentylene and 3,6-dioxa-1,4,7-trimethyl-1,8-octylene, 1,2- or 1,3-cyclopentylene, 1,2-, 1,3- or 1,4-cyclohexylene, cyclooctylene or cyclododecylene.

Examples of $R^4$ are hydrogen and methyl, preferably hydrogen.

Examples of $R^5$ are hydrogen and methyl, preferably hydrogen.

Examples of $R^6$ are methylene, 1,2-ethylene, 1,2-propylene, 1,3-propylene, 1,2-butylene, 1,3-butylene, 1,4-butylene, 1,6-hexylene, 1,8-octylene, 1,10-decylene, 1,12-dodecylene, 2-methyl-1,3-propylene, 2-ethyl-1,3-propylene, 2,2-dimethyl-1,3-propylene, 2,2-dimethyl-1,4-butylene, 3-oxa-1,5-pentylene, 3,6-dioxa-1,8-octylene, 3,6,9-trioxa-1,1 1-undecylene, 4-oxa-1,7-heptylene, 4,8-dioxa-1,11-undecylene, 4,8,12-trioxa-1,15-pentadecylene, 5-oxa-1,9-nonylene, 5,10-dioxa-1,14-tetradecylene, 3-oxa-2,5-dimethyl-1,5-pentylene, 3,6-dioxa-2,5,8-trimethyl-1,8-octylene, 3-oxa-1,4-dimethyl-1,5-pentylene and 3,6-dioxa-1,4,7-trimethyl-1,8-octylene, 1,2- or 1,3-cyclopentylene, 1,2-, 1,3- or 1,4-cyclohexylene, cyclooctylene or cyclododecylene.

Examples of $R^7$ are hydrogen and methyl, preferably hydrogen.

Preferred monomers b1) are 2-vinyloxyethyl (meth)acrylate, 4-vinyloxybutyl (meth)acrylate, 6-vinyloxyhexyl (meth)acrylate, 2(allyloxy)ethyl (meth)acrylate, polyethylene glycol monoallyl ether mono(meth)acrylate, and particular preference is given to 4-vinyloxybutyl (meth)acrylate.

Preferred monomers b2) are 2-(meth)acryloylethyl (meth)acrylate, 4-(meth)acryloylbutyl (meth)acrylate, 6-(meth)acryloylhexyl (meth)acrylate, 8-(meth)acryloyloctyl (meth)acrylate, 10-(meth)acryloyidecyl (meth)acrylate, 12-(meth)acryloyldodecyl (meth)acrylate, 2-(meth)acryloylpropyl (meth)acrylate, polypropylene glycol di(meth)acrylate, polyethylene glycol di(meth)acrylate, N-(meth)acryloylmethyl (meth)acrylamide.

The b1)-comprising polyolefin waxes of the invention generally have the following composition (in mol %):
a) from 75 to 99.9 mol %, preferably from 80 to 99.5 mol %, particularly preferably from 85 to 99 mol %,
b1) from 0.1 to 15 mol %, preferably from 0.5 to 15 mol %, particularly preferably from 1 to 15 mol %,
c) from 0 to 25 mol %, preferably from 0 to 15 mol %, particularly preferably from 0 to 10 mol %, very particularly preferably from 0 to 5 mol % and in particular 0 mol %, with the proviso that the sum is 100 mol %.

The b2)-comprising polyolefin waxes of the invention generally have the following composition (in mol %):
a) from 75 to 99.9 mol %, preferably from 80 to 99.5 mol %, particularly preferably from 85 to 99 mol %,
b2) from 0.1 to 25 mol %, preferably from 0.5 to 20 mol %, particularly preferably from 1 to 15 mol %,
c) from 0 to 25 mol %, preferably from 0 to 15 mol %, particularly preferably from 0 to 10 mol %, very particularly preferably from 0 to 5 mol % and in particular 0 mol %, with the proviso that the sum is 100 mol %.

Polyolefin waxes according to the invention can also comprise both b1) and b2) in the abovementioned amounts.

The number average molecular weight Mn of the polyolefin waxes of the invention is up to 20 000 g/mol, preferably up to 18 000 g/mol and particularly preferably up to 15 000 g/mol.

The present invention further provides a process for preparing the polyolefin waxes of the invention.

This process comprises the following steps:
(1) preparation of a polyolefin wax by copolymerization of
A) at least one olefin without further functional groups,
B1) at least one hydroxyalkyl alkenyl ether and/or hydroxyalkyl allyl ether and/or
B2) at least one hydroxyalkyl (meth)acrylate and/or hydroxyalkyl(meth)acrylamide and
C) if appropriate, at least one monomer which is different from A), B1) and B2) and bears at least one functional group,
(2) if appropriate, purification of the polyolefin wax obtained,
(3) esterification of the polyolefin wax obtained from (1) or (2) with (meth)acrylic acid and/or transesterification with (meth)acrylic ester,
(4) if appropriate, purification of the (meth)acrylated polyolefin wax obtained.

Monomers A) can be the same ones as described above as monomers a).

Monomers C) can be the same ones as described above as monomers c).

The monomers B1) are at least one hydroxyalkyl alkenyl ether or hydroxyalkyl allyl ether, preferably at least one hydroxyalkyl alkenyl ether.

These are, for example, ethers of the formula (IV)

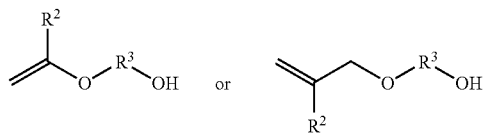

where $R^2$ and $R^3$ are as defined above.

Examples of comonomers B1) are 2-hydroxyethyl vinyl ether, 2-hydroxypropyl vinyl ether, 3-hydroxypropyl vinyl ether, 4-hydroxybutyl vinyl ether, 6-hydroxyhexyl vinyl ether, ethylene glycol monoallyl ether, polyethylene glycol monoallyl ether, 4-hydroxybutyl allyl ether, 6-hydroxyhexyl allyl ether, diethylene glycol monoallyl ether, propylene glycol monoallyl ether, dipropylene glycol monoallyl ether, 1,3-propanediol monoallyl ether, glycerol monoallyl ether and trimethylolpropane monoallyl ether.

Preference is given to 4-hydroxybutyl vinyl ether.

The monomers B2) are at least one hydroxyalkyl (meth)acrylate or hydroxyalkyl(meth)acrylamide, preferably at least one hydroxyalkyl (meth)acrylate.

Examples are compounds of the formula (V)

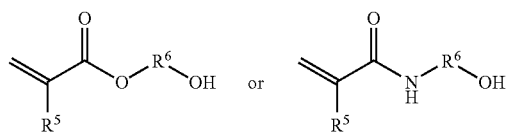

where $R^5$ and $R^6$ are as defined above.

Examples of comonomers B2) are 2-hydroxyethyl (meth)acrylate, 2-hydroxypropyl (meth)acrylate, 3-hydroxypropyl (meth)acrylate, 2-hydroxybut-1-yl (meth)acrylate, 4-hydroxybut-1-yl (meth)acrylate, 3-hydroxybut-1-yl (meth)acrylate, 6-hydroxyhex-1-yl (meth)acrylate, 8-hydroxyoct-1-yl (meth)acrylate, 3-hydroxy-2,2-dimethylpropyl (meth)acrylate, 2-ethyl-3-hydroxyhex-1-yl (meth)acrylate, 2,4-diethyl-5-hydroxy-oct-1-yl (meth)acrylate, trimethylolpropane mono(meth)acrylate, pentaerythritol mono(meth)acrylate or glycerol mono(meth)acrylate, polypropylene glycol mono(meth)acrylate, polyethylene glycol mono(meth)acrylate, N-methylolmethacrylamide (=N-(hydroxymethyl)methacrylamide) and N-(hydroxymethyl)methacrylamide.

Preferred comonomers B2 are 2-hydroxyethyl (meth)acrylate, 2-hydroxypropyl (meth)acrylate, 3-hydroxypropyl (meth)acrylate, 4-hydroxybut-1-yl (meth)acrylate and 6-hydroxyhex-1-yl (meth)acrylate, and particular preference is given to 2-hydroxyethyl (meth)acrylate and 2-hydroxypropyl (meth)acrylate.

The composition of the B1)-comprising polyolefin waxes is generally as follows (in mol %):
A) from 75 to 99.9 mol %, preferably from 80 to 99.5 mol %, particularly preferably from 85 to 99 mol %,
B1) from 0.1 to 15 mol %, preferably from 0.5 to 15 mol %, particularly preferably from 1 to 15 mol %, C) from 0 to 25 mol %, preferably from 0 to 15 mol %, particularly preferably from 0 to 10 mol %, very particularly preferably from 0 to 5 mol % and in particular 0 mol %, with the proviso that the sum is 100 mol %.

The composition of the B2)-comprising polyolefin waxes is generally as follows (in mol %):
A) from 75 to 99.9 mol %, preferably from 80 to 99.5 mol %, particularly preferably from 85 to 99 mol %,
B2) from 0.1 to 25 mol %, preferably from 0.5 to 20 mol %, particularly preferably from 1 to 15 mol %,
C) from 0 to 25 mol %, preferably from 0 to 15 mol %, particularly preferably from 0 to 10 mol %, very particularly preferably from 0 to 5 mol % and in particular 0 mol %, with the proviso that the sum is 100 mol %.

It is also possible to use both B1) and B2) in the above-mentioned amounts in the process of the invention.

The polyolefin wax is generally prepared as follows:

The preparation of the polyolefin waxes of the invention by the process of the invention can be carried out in stirred high-pressure autoclaves or in high-pressure tube reactors. The preparation in stirred high-pressure autoclaves is preferred. The stirred high-pressure autoclaves employed for the process of the invention are known per se, and a description may be found in Ullmann's Encyclopedia of Industrial Chemistry, 5th edition, Keyword: Waxes, vol. A 28, p. 146 ff., Verlag Chemie Weinheim, Basle, Cambridge, N.Y., Tokyo, 1996.

Their length: diameter ratio is predominantly in the range from 5:1 to 30:1, preferably from 10:1 to 20:1. The high-pressure tube reactors which can likewise be employed are likewise described in Ullmann's Encyclopedia of Industrial Chemistry, 5th edition, keyword: Waxes, vol. A 28, p.146 ff., Verlag Chemie Weinheim, Basle, Cambridge, N.Y., Tokyo, 1996.

Suitable pressure conditions for the polymerization are from 500 to 4000 bar, preferably from 1500 to 2500 bar. The reaction temperatures are in the range from 170 to 300° C., preferably in the range from 200 to 280° C.

The process of the invention can be carried out in the presence of a regulator. Regulators used are, for example, hydrogen or an aliphatic aldehyde or an aliphatic ketone.

Examples are formaldehyde, acetaldehyde, propionaldehyde, n-butyraldehyde, isobutyraldehyde, n-valeraldehyde, isovaleraldehyde, acetone, ethyl methyl ketone, diethyl ketone, isobutyl methyl ketone, cyclohexanone, cyclopentanone and cyclododecanone.

The use of propionaldehyde or ethyl methyl ketone as regulator is very particularly preferred.

Further very well-suited regulators are alkylaromatic compounds, for example toluene, ethylbenzene or one or more isomers of xylene.

Further well-suited regulators are unbranched aliphatic hydrocarbons such as propane. Particularly good regulators are branched aliphatic hydrocarbons having tertiary H-atoms, for example isobutane, isopentane, isooctane or isododecane (2,2,4,6,6-pentamethylheptane). Isododecane is very particularly suitable.

The amount of regulator used corresponds to the amounts customary for the high-pressure polymerization process.

As initiators for the free-radical polymerization, it is possible to use the customary free-radical initiators such as organic peroxides, oxygen or azo compounds. Mixtures of a plurality of free-radical initiators are also suitable.

As free-radical initiators, use is made of one or more peroxides selected from among the commercially available substances didecanoyl peroxide, 2,5-dimethyl-2,5-di(2-ethylhexanoylperoxy)hexane, tert-amyl peroxy-2-ethylhexanoate, tert-amyl peroxypivalate, dibenzoyl peroxide, tert-butyl peroxy-2-ethylhexanoate, tert-butyl-peroxydiethylacetate, tert-butyl peroxydiethylisobutyrate, 1,4-di(tert-butyl-peroxycarbo)cyclohexane as a mixture of isomers, tert-butyl perisononanoate 1,1-di(tert-butylperoxy)-3, 3,5-trimethylcyclohexane, 1,1-di(tert-butylperoxy) cyclohexane, methyl isobutyl ketone peroxide, tert-butyl peroxyisopropylcarbonate, 2,2-di-tert-butylperoxybutane or tert-butyl peroxyacetate; tert-butylperoxybenzoate, di-tert-amyl peroxide, dicumyl peroxide, the isomeric di(tert-butylperoxyisopropyl)benzenes, 2,5-dimethyl-2,5-di-tert-butylperoxyhexane, tert-butyl cumyl peroxide, 2,5-dimethyl-2,5-di (tert-butylperoxy)hex-3-yne, di-tert-butyl peroxide, 1,3-diisopropyl monohydroperoxide, cumene hydroperoxide or tert-butylhydroperoxide; or dimeric or trimeric ketone peroxides.

Dimeric or trimeric ketone peroxides and methods of preparing them are known from EP-A 0 813 550.

Particularly suitable peroxides are di-tert-butyl peroxide, tert-butyl peroxypivalate, tert-amyl peroxypivalate, tert-butyl peroxyisononanoate and dibenzoyl peroxide and mixtures of these. An azo compound which may be mentioned by way of example is azobisisobutyronitrile ("AIBN"). The free-radical initiators are introduced in amounts customary for polymerizations.

The process of the invention is preferably carried out in the presence of solvents, with mineral oils and other solvents which are present in small proportions in the process of the invention and have been used, for example, for stabilizing the free-radical initiator or initiators counting, for the purposes of the present invention, as solvents for the process of the invention. Further solvents are, for example, aromatic solvents. Particularly preferred aromatic hydrocarbons are toluene, xylene isomers and ethylbenzene.

Preference is given to aromatic hydrocarbons, (cyclo)aliphatic hydrocarbons, alkyl alkanoates, alkoxylated alkyl alkanoates and mixtures thereof.

Particular preference is given to monoalkylated or multiply alkylated benzenes and naphthalenes, alkyl alkanoates and alkoxylated alkyl alkanoates and also mixtures thereof.

As aromatic hydrocarbon mixtures, preference is given to those which comprise predominantly aromatic $C_7$-$C_{14}$-hydrocarbons and can comprise a boiling range from 110 to 300° C.; particular preference is given to toluene, o-, m- or p-xylene, trimethylbenzene isomers, tetramethylbenzene isomers, ethylbenzene, cumene, tetrahydronaphthalene and mixtures comprising such hydrocarbons.

Examples are the Solvesso® grades from ExxonMobil Chemical, in particular Solvesso® 100 (CAS No. 64742-95-6, predominantly $C_9$- and $C_{10}$-aromatics, boiling range about 154-178° C.), 150 (boiling range about 182-207° C.) and 200 (CAS No. 64742-94-5), and the Shellsol® grades from Shell. Hydrocarbon mixtures of paraffins, cycloparaffins and aromatics are also commercially available under the names Kristallöl (for example Kristallöl 30, boiling range about 158-198° C. or Kristallöl 60: CAS No. 64742-82-1), white spirit (for example likewise CAS No. 64742-82-1) or solvent naphtha (light: boiling range about 155-180° C., heavy: boiling range about 225-300° C.). The aromatics content of such hydrocarbon mixtures is generally more than 90% by weight, preferably more than 95% by weight, particularly preferably more than 98% by weight and very particularly preferably more than 99% by weight. It can be advantageous to use hydrocarbon mixtures having a particularly reduced content of naphthalene.

The monomers are usually introduced together or separately. The ratio in the metered addition usually does not correspond precisely to the ratio of the monomer building blocks in the polyolefin waxes of the invention, because hydroxyalkyl alkenyl ethers and hydroxyalkyl (meth)acrylates B1) and B2) are generally incorporated more easily and more quickly into the polyolefin waxes of the invention than are olefins, specifically ethylene.

The polyolefin waxes of the invention can be dispersed extremely well; in particular, they can be emulsified particularly well in the molten state. The present invention therefore provides dispersions, in particular aqueous dispersions, comprising the polyolefin waxes of the invention.

The purification (2) of the polyolefin waxes obtained in this way from step (1) is optional and can, if appropriate, be carried out by washing the waxes with solvents and subsequently filtering or centrifuging them off.

To remove unreacted monomers, a vacuum distillation or stripping operation can also be advantageous. For example, the main amount of the monomers is separated off by distillation in a first step and the remainder of the monomers is subsequently removed by stripping with a gas which is inert under the reaction conditions, preferably an oxygen-comprising gas, particularly preferably air or an air/nitrogen mixture, or else with carbon dioxide or steam.

Purification is generally not necessary and is preferably not carried out.

If step (3) is carried out in the form of an esterification, the following procedure is generally employed:

The esterification apparatus comprises a reactor with circulation vaporizer and a superposed distillation column with condenser and phase separation vessel.

The reactor can be, for example, a reactor with double-wall heating and/or internal heating coils. Preference is given to using a reactor with an external heat exchanger and natural convection or forced circulation (using a pump), particularly preferably natural convection in which the circulating stream is created without mechanical aids.

Suitable circulation vaporizers are known to those skilled in the art and are described, for example, in R. Billet, Verdampfertechnik, HTB-Verlag, Bibliographisches Institut Mannheim, 1965, 53. Examples of circulation vaporizers are shell-and-tube heat exchangers, plate heat exchangers, etc.

Of course, it is also possible for a plurality of heat exchangers to be present in the circuit.

The distillation column is of a type known per se and has the customary internals. As column internals, it is in principle possible to use all customary internals, for example trays, ordered packing and/or random packing. Among trays, preference is given to bubble cap trays, sieve trays, valve trays, Thormann trays and/or dual-flow trays; among the types of random packing, those comprising rings, helices, saddle bodies or braids are preferred.

From 5 to 20 theoretical plates are generally sufficient.

The condenser and the separation vessel are of a conventional type.

(Meth)acrylic acid and the polyolefin waxes bearing hydroxyalkyl groups are generally used in equivalent amounts based on the hydroxyl groups of the polyolefin wax, but it is also possible to use a substoichiometric amount or an excess of (meth)acrylic acid.

Preference is given to setting an excess of (meth)acrylic acid per hydroxyl group to be esterified (equivalents) of 5-100 mol %, preferably from 5 to 50 mol % and particularly preferably from 5 to 25 mol % and in particular from 5 to 10 mol %.

As esterification catalysts, it is possible to use the customary mineral acids and sulfonic acids, preferably sulfuric acid, phosphoric acid, alkylsulfonic acids (e.g. methanesulfonic acid, trifluoromethanesulfonic acid) and arylsulfonic acids (e.g. benzenesulfonic acid, p-toluenesulfonic acid or dodecylbenzenesulfonic acid) or mixtures thereof, but acidic ion exchangers are also conceivable.

Particular preference is given to sulfuric acid, methanesulfonic acid and p-toluenesulfonic acid or mixtures thereof.

They are generally used in an amount of 0.1-5% by weight, based on the esterification mixture, preferably 0.5-5% by weight, particularly preferably 1-4% by weight and very particularly preferably 2-4% by weight.

If necessary, the esterification catalyst can be removed from the reaction mixture by means of an ion exchanger. The ion exchanger can in this case be introduced directly into the reaction mixture and subsequently filtered off or the reaction mixture can be passed over a bed of ion exchanger.

Preference is given to leaving the esterification catalyst in the reaction mixture and removing it by washing (see below).

Suitable polymerization inhibitors which can be used in the esterification are phenothiazine, monohydric and polyhydric phenols which can, if appropriate, have one or more alkyl groups, e.g. alkyl phenols, for example o-, m- or p-cresol (methylphenol), 2-tert-butyl-4-methylphenol, 6-tert-butyl-2,4-dimethylphenol, 2,6-di-tert-butyl-4-methylphenol, 2-methylhydroquinone, 2,5-di-tert-butylhydroquinone, 2-tert-butylphenol, 4-tert-butylphenol, 2,4-di-tert-butylphenol, 2-methyl-4-tert-butylphenol, 4-tert-butyl-2,6-dimethylphenol, 2,5-di-tert-butylhydroquinone, toluhydroquinone, or 2,2'-methylene bis(6-tert-butyl-4-methylphenol), hydroxyphenols, for example hydroquinone, catechol (1,2-dihydroxybenzene) or benzoquinone, aminophenols, such as para-aminophenol, nitrosophenols, such as para-nitrosophenol, alkoxyphenols, for example 2-methoxyphenol (guaiacol, catechol monomethyl ether), 2-ethoxyphenol, 2-isopropoxyphenol, 4-methoxyphenol (hydroquinone monomethyl ether), mono- or di-tert-butyl-4-methoxyphenol, tocopherols, such as α-tocopherol and also 2,3-dihydro-2,2-dimethyl-7-hydroxybenzofuran (2,2-dimethyl-7-hydroxycoumaran), phosphorus compounds, e.g. triphenyl phosphite, hypophosphorous acid or alkylester of phosphorous acid, copper or manganese salts, cerium salts, nickel salts, chromium salts or copper salts, for example chlorides, sulfates, salicylates, tosylates, acrylates or acetates, 4-hydroxy-2,2,6,6-tetramethylpiperidin-N-oxyl, 4-oxo-2,2,6,6-tetramethylpiperidin-N-oxyl, 4-acetoxy-2,2,6,6-tetramethylpiperidin-N-oxyl, 2,2,6,6-tetramethylpiperidin-N-oxyl, 4,4',4"-tris(2,2,6,6-tetramethylpiperidin-N-oxyl)phosphite or 3-oxo-2,2,5,5-tetramethylpyrrolidin-N-oxyl, N,N-diphenylamine, N-nitrosodiphenylamine, N,N'-dialkyl-paraphenylenediamines, phenothiazine and mixtures thereof.

Preference is given to using at least one compound from the group consisting of hydroquinone, hydroquinone monomethyl ether, 2-tert-butyl-4-methylphenol, 6-tert-butyl-2,4-dimethylphenol, 2,6-di-tert-butyl-4-methylphenol, 2-tert-butylphenol, 4-tert-butylphenol, 2,4-di-tert-butylphenol, 2-methyl-4-tert-butylphenol, 4-tert-butyl-2,6-dimethylphenol, hypophosphorous acid, copper acetate, copper chloride and copper salicylate as polymerization inhibitor (mixture).

To aid stabilization further, an oxygen-comprising gas, preferably air or a mixture of air and nitrogen (lean air), can be present.

This oxygen-comprising gas is preferably introduced into the bottom region of a column and/or into a circulation vaporizer or passed through the reaction mixture.

The polymerization inhibitor (mixture) is used in a total amount of 0.01-1 % by weight, based on the esterification mixture, preferably 0.02-0.8% by weight, particularly preferably 0.05-0.5% by weight.

Suitable solvents for the azeotropic removal of the water of reaction are, in particular, aliphatic, cycloaliphatic and aromatic hydrocarbons or mixtures thereof.

Preference is given to using n-pentane, n-hexane, n-heptane, cyclohexane, methylcyclohexane, benzene, toluene or xylene. Cyclohexane, methylcyclohexane and toluene are particularly preferred.

The amount used is 10-200% by weight, preferably 20-100% by weight, particularly preferably from 30 to 100% by weight, based on the sum of alcohol and (meth)acrylic acid.

The reaction temperature is generally 60-140° C., preferably 70-110° C., very particularly preferably 75-100° C. The initial temperature is generally less than 100° C., preferably less than 90° C. and particularly preferably less than 80° C. The final temperature in the esterification is generally 5-30° C. higher than the initial temperature. The temperature in the esterification can be determined and regulated by variation of the solvent concentration in the reaction mixture, as described in DE-A 199 41 136 and DE-A 100 63 175.

The esterification can be carried out at atmospheric pressure but also at superatmospheric pressure or subatmospheric pressure; preference is given to working at atmospheric pressure.

The reaction time is generally 3-20 hours, preferably 5-15 hours and particularly preferably from 7 to 12 hours.

If reaction step (3) is carried out in the form of a transesterification, the following procedure is generally employed:

A lower (meth)acrylic ester, for example a $C_1$-$C_{10}$-alkyl (meth)acrylate, preferably $C_1$-$C_4$-alkyl (meth)acrylate, particularly preferably the methyl, ethyl or n-butyl ester, more particularly preferably the n-butyl ester, is reacted with the polyolefin wax bearing hydroxyalkyl groups in a molar ratio of ester: alcohol of 1:1-4:1 in the presence of at least one catalyst.

The transesterification can be carried out batchwise, semicontinuously or continuously, and is preferably carried out batchwise.

The process of the invention can be carried out using all transesterification catalysts described in the prior art, preferably titanium, magnesium or aluminum alkoxides, particularly preferably titanium alkoxides and in particular titanium alkoxides of the alcohols present in the transesterification. Further conceivable transesterification catalysts are metal chelate compounds of, for example, hafnium, titanium, zirconium or calcium, alkali metal and magnesium alkoxides, organic tin compounds or calcium and lithium compounds, for example oxides, hydroxides, carbonates or halides.

The alcohol formed in the transesterification is separated off by distillation or rectification, if appropriate under reduced pressure. This can, if appropriate, be aided by stripping with a suitable, relatively unreactive gas. The residue obtained represents the catalyst solution for the transesterification (Ti content: 2-10% by weight) and generally comprises less than 400 ppm of liberated alcohol. Virtually no extraneous alcohol is therefore introduced into the transesterification mixture (<100 ppm in the mixture).

When a titanate is used, the titanium content of the reaction mixture is generally 0.01-1% by weight.

The transesterification is carried out in one or more reactor(s) connected in series combined with at least one superposed rectification column and condensers.

The reaction temperature is generally 80-140° C., preferably from 100 to 130° C., and the pressure is generally from 200 mbar to atmospheric pressure, preferably 300-800 mbar and particularly preferably from 400 to 600 mbar.

In the case of a plurality of reactors, the temperature in the different reactors can be identical or different, e.g. can increase or decrease along the reactors. It preferably increases.

Heat can be supplied via wall heating and/or external or internal heat exchangers, e.g. tube or plate heat exchangers, preferably via external circulation vaporizers. The rectification columns are of a known type and have separation-active internals (e.g. bubble cap trays, Thormann trays, valve trays, sieve trays or dual-flow trays) or comprise random packing or ordered packing. The condensers are likewise of a known type and can be operated indirectly, e.g. as tube or plate heat exchangers, or directly, e.g. as quench coolers. Uniform mixing of the reaction solution is achieved in a known manner, e.g. by stirring, pumping in a circuit, forced or natural circulation, preferably by forced or natural circulation.

According to the invention, the reaction zone and/or the heat exchangers installed in the plant, e.g. the distillation units or reactors, is/are flushed continuously with a gas or gas mixture which is inert under the reaction conditions, e.g. nitrogen, air, nitrogen/oxygen mixtures, argon, helium, carbon dioxide or monoxide, preferably air or air/nitrogen mixtures, in particular those having an oxygen content of from 0.1 to 15% by volume, preferably from 0.5 to 10% by volume and very particularly preferably air/nitrogen mixtures having an oxygen content of from 1 to 5% by volume. The flushing gas is preferably passed along the heat-exchange surfaces present, particularly preferably in a forced or natural circulation vaporizer present.

For this purpose, the flushing gas is fed in under pressure or volume control through a suitable unrestricted feed device known per se in the vicinity of the heat-exchange surface present so that the, preferably continuous, stream of flushing gas flows along the heat-exchange surface in countercurrent or cocurrent to the liquid.

The flushing gas can be preheated to the temperature of the heat-exchange medium, so that the temperature of the flushing gas differs, for example, by not more than 15° C. from the temperature of the heat-transfer medium, preferably by not more than 10° C.

Per hour, 0.1-100 parts by volume of flushing gas are in each case passed through heat exchangers or the reaction zone, preferably 0.2-80 parts by volume, particularly preferably 0.5-70 parts by volume and in particular 1-50 parts by volume, based on the volume of the reaction mixture (=1 part by volume) in the reactors and after-reactors in the reaction zone.

Particular preference is given to passing the flushing gas over the heat exchangers in which the reaction medium in the reactors or in the distillation columns is heated.

The residence time in the reaction zone comprising the reactor(s) and any after-reactor(s) is 1-4 hours, preferably 1.5-3 hours.

The column(s) superposed on the reactor(s) generally has/have 10-30 theoretical plates. The reflux ratio is generally 5-20:1, preferably 7-15:1.

The lower alcohol liberated in the transesterification is separated off together with part of the lower (meth)acrylic ester at the top of the rectification columns superposed on the reactors.

The distillation conditions, e.g. the number of theoretical plates and the reflux ratio, are preferably selected so that a nonazeotropic mixture in which the content of lower (meth) acrylic ester is higher than in the azeotropic composition of lower alkanol and lower (meth)acrylic ester under the respective conditions is taken off at the top of the column.

Stabilization of the columns can be effected by means of customary stabilizers or mixtures thereof, for example those mentioned above.

The stabilization can be effected in the presence or absence of molecular oxygen. Preference is given to using phenothiazine, hydroquinone, hydroquinone monomethyl ether, 4-hydroxy-2,2,6,6-tetramethylpiperidin-N-oxyl, 4-oxo-2,2,6,6-tetra-methylpiperidin-N-oxyl, 2,6-tert-butyl-p-cresol or mixtures thereof in amounts of in each case from 10 to 5000 ppm for stabilization; particular preference is given to using phenothiazine or a phenothiazine-comprising mixture, in particular a phenothiazine/4-hydroxy-2,2,6,6-tetramethylpiperidin-N-oxyl mixture, for the stabilization. Addition can in each case occur via the starting materials, either directly or via the recirculation or runback streams.

In particular, stabilization is effected using the runback admixed with 100-1000 ppm of phenothiazine and 10-500 ppm of 4-hydroxy-2,2,6,6-tetramethylpiperidin-N-oxyl.

Stabilization is preferably effected using a solution of this stabilizer mixture in the lower (meth)acrylic ester.

The dissolved stabilizer mixture is particularly preferably sprayed onto the condenser surfaces.

The purification (4) of the (meth)acrylated polyolefin waxes obtained in this way from step (3) is optional and can, if appropriate, be carried out by washing unreacted (meth) acrylic acid with aqueous, if appropriate weakly basic solutions and subsequently filtering, centrifuging or separating phases.

To remove unreacted (meth)acrylic acid or (meth)acrylic esters, a vacuum distillation or stripping operation can also be advantageous. For example, the main amount of the monomers is separated off by distillation in a first step and the remainder of the monomers is subsequently removed by stripping with a gas which is inert under the reaction conditions, preferably an oxygen-containing gas, particularly preferably air or an air/nitrogen mixture, or else with carbon dioxide or steam.

In general, purification is useful and is preferably carried out.

However, it can also be appropriate to leave unreacted (meth)acrylic acid or (meth)acrylic ester in the reaction mixture, since these can, depending on the planned use, function as reactive diluents (see below) in subsequent polymerizations.

The temperature in a distillation or stripping operation is generally 80-160° C., preferably 90-150° C. and particularly preferably 90-120° C., and the corresponding pressure in a distillation is generally 20-500 mbar, preferably 50-300 mbar and particularly preferably 80-150 mbar. Stripping is usually carried out under atmospheric pressure.

If appropriate, the distillation process can be aided by passing a gas stream which is essentially inert under the reaction conditions as described above (stripping), e.g. nitrogen or else an oxygen-comprising gas such as air or an air/nitrogen mixture, in particular a mixture having an oxygen content of from 0.1 to 15% by volume, preferably from 0.5 to 10% by volume and very particularly preferably an air/nitrogen mixture having an oxygen content of from 1 to 5% by volume, through the reaction mixture. The passing-through of the flushing gas according to the invention is preferably combined with the stripping process.

In a particularly preferred embodiment of the present invention, the esterification or transesterification in reaction step (3) is carried out in the presence of an enzyme.

In reaction step (3), the esterification with (meth)acrylic acid or preferably the transesterification of the polyolefin wax bearing hydroxyalkyl groups with at least one, preferably one, (meth)acrylate (D) is carried out in the presence of at least one, preferably one, enzyme (E) which catalyzes the esterification or transesterification.

Compounds (D) can be (meth)acrylic acid or esters of (meth)acrylic acid with a saturated alcohol, preferably saturated $C_1$-$C_{10}$ alkyl esters or $C_3$-$C_{12}$-cycloalkyl esters of (meth)acrylic acid, particularly preferably saturated $C_1$-$C_4$-alkyl esters of (meth)acrylic acid.

For the purposes of the present text, the term saturated refers to compounds without C—C multiple bonds (naturally apart from the C=C double bond in the (meth)acrylic units).

Examples of compounds (D) are methyl, ethyl, n-butyl, isobutyl, n-octyl and 2-ethylhexyl (meth)acrylates, 1,2-ethylene glycol di(meth)acrylate and mono(meth)acrylate, 1,4-butanediol di(meth)acrylate and mono(meth)acrylate, 1,6-hexanediol di(meth)acrylate and mono(meth)acrylate, trimethylolpropane tri(meth)acrylate and pentaerythritol tetra(meth)acrylate.

Particular preference is given to methyl, ethyl, n-butyl and 2-ethylhexyl (meth)acrylates and very particularly preferably methyl, ethyl and n-butyl (meth)acrylates.

If the abovementioned alcohols are optically active, they are preferably used in racemic form or as mixtures of diastereomers, although it is also possible to use them as pure enantiomers or diastereomers or as mixtures of enantiomers.

The enzymatic esterification or transesterification with (meth)acrylate is generally carried out at from 0 to 100° C., preferably from 20 to 80° C., particularly preferably from 20 to 70° C., very particularly preferably from 20 to 60° C.

Enzymes (E) which can be used according to the invention are, for example, selected from among hydrolases (E.C. 3.-.-.-), and among these in particular from among esterases (E.C. 3.1.-.-), lipases (E.C. 3.1.1.3), glycosylases (E.C. 3.2.-.-) and proteases (E.C. 3.4.-.-) in free form or immobilized chemically or physically on a support, preferably lipases, esterases or proteases and particularly preferably esterases (E.C. 3.1.-.-). Very particular preference is given to Novozyme 435 (lipase from *Candida antarctica* B) or lipase from *Alcaligenes* sp., *Aspergillus* sp., *Mucor* sp., *Penicilium* sp., *Geotricum* sp., *Rhizopus* sp., *Burkholderia* sp., *Candida* sp., *Pseudomonas* sp., *Thermomyces* sp. or pig pancreas, in particular lipase from *Candida antarctica* B or from *Burkholderia* sp.

The enzyme content of the reaction medium is generally in the range from about 0.1 to 10% by weight, based on the polyolefin wax bearing hydroxyalkyl groups which is used.

The reaction time depends, inter alia, on the temperature, the amount used and the activity of the enzyme catalyst and on the required conversion and also on the type of polyolefin wax bearing hydroxyalkyl groups. The reaction time is preferably chosen so that the conversion of the hydroxy functions comprised in the polyolefin wax bearing hydroxyalkyl groups and to be reacted is at least 70%, preferably at least 80%, particularly preferably at least 90%, very particularly preferably at least 95%, in particular at least 97% and especially at least 98%. In general, from 1 to 72 hours, preferably from 3 to 36 hours and particularly preferably from 3 to 24 hours, are sufficient for this.

In an alternative embodiment of the invention, the hydroxy functions comprised in the polyolefin wax bearing hydroxyalkyl groups are only partly reacted, for example to an extent of from 10 to 80%, preferably from 15 to 70%, particularly preferably from 20 to 60%, very particularly preferably from 25 to 55%, in particular from 30 to 50% and especially from 40 to 50%. Such partially esterified polyolefin waxes can be used particularly advantageously in dual-cure hardening (see below).

In such a case, a (meth)acrylated polyolefin wax comprising as formal, copolymerized formative components
a) at least one olefin without further functional groups,
b1) at least one alkenyloxyalkyl (meth)acrylate and/or allyloxyalkyl (meth)acrylate, and also
B1) at least one hydroxyalkyl alkenyl ether and/or hydroxyalkyl allyl ether and/or
b2) at least one (meth)acryloyloxyalkyl (meth)acrylate and/or (meth)acryloyloxyalkyl (meth)acrylamide and also
B2) at least one hydroxyalkyl (meth)acrylate and/or hydroxyalkyl(meth)acryamide and
b) if appropriate, at least one monomer which is different from a), b 1) and b2) and bears at least one functional group, in each case in copolymerized form, is formed, and this is likewise provided by the present invention.

The molar ratio of (meth)acrylic acid compound (D) (based on the (meth)acrylic units) to the polyolefin wax bearing hydroxyalkyl groups (based on hydroxyl groups) can be set within a wide range, e.g. in a ratio of from 100:1 to 1:1, preferably from 50:1 to 1:1, particularly preferably from 20:1 to 1:1 and very particularly preferably from 10:1 to 1:1.

The reaction can occur in organic solvents or mixtures thereof or without addition of solvents. Preference is given to no solvent being added. The batches are generally largely water-free (i.e. less than 10% by volume, preferably less than 5% by volume, particularly preferably less than 1% by volume and very particularly preferably less than 0.5% by volume, of added water).

Suitable organic solvents are, for example, tertiary monools known for this purpose, e.g. $C_3$-$C_6$-alcohols, preferably tert-butanol, tert-amyl alcohol, pyridine, poly-$C_1$-$C_4$-alkylene glycol di-$C_1$-$C_4$-alkyl ethers, preferably polyethylene glycol di-$C_1$-$C_4$-alkyl ethers, e.g. 1,2-dimethoxyethane, diethylene glycol dimethyl ether, polyethylene glycol dimethyl ether 500, methyl tert-butyl ether, ethyl tert-butyl ether, $C_1$-$C_4$-alkylene carbonates, in particular propylene carbonate, $C_3$-$C_6$-alkyl acetates, in particular tert-butyl acetate, THF, toluene, 1,3-dioxolane, acetone, isobutyl methyl ketone, ethyl methyl ketone, 1,4-dioxane, tert-butyl methyl ether, cyclohexane, methylcyclohexane, toluene, hexane, dimethoxymethane, 1,1-dimethoxyethane, acetonitrile and also their single-phase or multiphase mixtures. It can be advantageous to separate off water or alcohol liberated by means of a binary or tertiary heteroazeotrope which has a boiling point very close to the temperature optimum of the enzyme used. The alcohol removed in this way can be removed by phase separation or membrane vapor separation.

If desired, aqueous solvents can be added to the organic solvents, so that, depending on the organic solvent, single-phase or multiphase reaction solutions are formed. Examples of aqueous solvents are water and aqueous, dilute (e.g. from 10 to 100 mM) buffers, for example ones having a pH in the range from about 6 to 8, e.g. potassium phosphate or TRIS-HCl buffers.

The water content of the reaction mixture is generally 0-10% by volume. The reactants are preferably used without pretreatment (drying, water addition).

The substrates are present either as a solution, as a suspension of solids or as an emulsion in the reaction medium. The initial concentration of the reactants is preferably in the range from about 0.1 to 20 mol/l, in particular from 0.15 to 10 mol/l or from 0.2 to 5 mol/l.

The reaction can be carried out continuously, for example in a tube reactor or in a cascade of stirred reactors, or batchwise.

The reaction can be carried out in all reactors suitable for such a reaction. Such reactors are known to those skilled in the art. The reaction is preferably carried out in a stirred tank reactor or a fixed-bed reactor.

It is possible to use any methods of mixing the reaction mixture. Special stirring devices are not necessary. The reaction medium can consist of one or more phases and the reactants can be dissolved, suspended or emulsified therein, if appropriate together with the molecular sieves, and admixed with the enzyme preparation at the beginning of the reaction, and also, if appropriate, one or more times during the course of the reaction. The temperature is set to the desired value during the reaction and can, if desired, be increased or reduced during the course of the reaction.

If the reaction is carried out in a fixed-bed reactor, the fixed-bed reactor is preferably provided with the immobilized enzymes and the reaction mixture is then pumped through a column charged with the enzyme. It is also possible to carry out the reaction in a fluidized bed, in which case the enzyme is used in immobilized form on a support. The reaction mixture can be pumped continuously through the column, with the residence time and thus the desired conversion being able to be controlled by means of the flow rate. It is also possible to circulate the reaction mixture through a column by pumping, with the alcohol liberated being able to be distilled off simultaneously under reduced pressure.

The removal of water in the case of an esterification or alcohols which are liberated from the alkyl (meth)acrylates in the case of a transesterification is carried out continuously or stepwise in a manner known per se, e.g. by means of reduced pressure, azeotropic removal, absorption, pervaporation and diffusion through membranes.

This is preferably achieved by means of molecular sieves or zeolites (pore size, for example, in the range of about 3-10 Angströms), removal by distillation or by means of suitable semipermeable membranes.

However, it is also possible for the mixture of alkyl (meth)acrylate and the parent alcohol, which frequently forms an azeotrope, which has been separated off to be passed directly to a plant for preparing the alkyl (meth)acrylate in order to be reused there in an esterification with (meth)acrylic acid.

After the reaction is complete, the reaction mixture obtained from the esterification or transesterification can be used further without further purification or it can, if necessary, be purified in a further step.

In general, a purification step comprises merely separating off the enzyme used from the reaction mixture and separating the reaction product from any organic solvent used.

The enzyme is generally separated off by filtration, absorption, centrifugation or decantation. The enzyme which has been separated off can subsequently be used for further reactions.

The organic solvent is generally separated off by distillation, rectification or, in the case of solid reaction products, by filtration.

To purify the reaction product further, it can also be subjected to chromatography.

However, preference is given to separating off only the enzyme used and any solvent used in the purification step.

The reaction conditions in the enzymatic esterification or transesterification are mild. Owing to the low temperatures and other mild conditions, the formation of by-products during the reaction is avoided. These could otherwise originate, for example, from chemical catalysts or be formed by undesirable free-radical polymerization of the (meth)acrylate used, which can otherwise be prevented only by addition of stabilizers.

In carrying out the reaction according to the invention, additional stabilizers, for example hydroquinone monomethyl ether, phenothiazine, phenols, such as 2-tert-butyl-4-methylphenol, 6-tert-butyl-2,4-dimethylphenol or N-oxyls, such as 4-hydroxy-2,2,6,6-tetramethylpiperidin-N-oxyl, 4-oxo-2,2,6,6-tetramethylpiperidin-N-oxyl, can be added in amounts of, for example, from 50 to 2000 ppm to the (meth) acrylic compound (D) in addition to the storage stabilizer which is present in any case. The esterification or transesterification is advantageously carried out in the presence of an oxygen-comprising gas, preferably air or an air/nitrogen mixture.

However, addition of a stabilizer can preferably be dispensed with in the enzymatic esterification or transesterification.

Furthermore, the enzyme catalyst can be removed from the end product without problems.

The reaction mixture can, if desired, be purified, for example by filtration, distillation, rectification, chromatography, treatment with ion exchangers, adsorbents, neutral, acidic and/or alkaline scrubbing, stripping or crystallization.

The color number of the (meth)acrylated polyolefin waxes obtained according to the invention is generally below 100 APHA in accordance with DIN ISO 6271, preferably below 80, particularly preferably below 60, very particularly preferably below 40 and in particular below 20 APHA.

The present invention further provides for the use of the polyolefin waxes of the invention or the polyolefin waxes prepared in this way as
- dispersants for pigments,
- lubricants, in particular for PVC polymers,
- matting agents for surface coatings,
- surface-active agents for printing inks,
- leather coating,
- textile coating or
- n radiation-curable and/or thermally curable coating compositions.

Coatings comprising the polyolefin waxes of the invention have very high scratch resistances, hardnesses, chemical resistances, a pleasant feel, elasticity and/or adhesion, both to hydrophilic substrates and to hydrophobic substrates.

The (meth)acrylated polyolefin waxes which are obtainable according to the invention can advantageously be used as monomers or comonomers in poly(meth)acrylates or as reactive diluents in thermally curable, radiation-curable and/or dual-cure poly(meth)acrylates. Such poly(meth)acrylates are suitable, for example, as binders in thermally curable, radiation curable or dual-cure coating compositions and also in adhesives, e.g. acrylate adhesives, and in sealants. Furthermore, the (meth)acrylated polyolefin waxes can be used in polyurethanes, for example PU dispersions, PU foams, PU adhesives and PU coatings. The term thermally curable refers to, for example, one-component and two-component surface coating systems which can additionally be reacted with crosslinking reagents, e.g. melamine resins or isocyanate derivatives.

The present invention therefore further provides for the use of the (meth)acrylated polyolefin waxes prepared by the process of the invention as reactive diluents or binders in radiation-curable or dual-cure coating compositions, preferably in topcoats, particularly preferably in transparent varnishes. Of course, the (meth)acrylated polyolefin waxes prepared according to the invention can also be used as monomers in polymerizations, if appropriate together with other polymerizable monomers such as (meth)acrylic acid, (meth)acrylic esters, styrene, butadiene, acrylonitrile, vinyl acetate, N-vinylpyrrolidone, 4-hydroxybutyl vinyl ether or N-vinylformamide.

The expression "dual-cure" means that the coating compositions can be cured thermally and by means of actinic radiation. For the purposes of the present invention, actinic radiation is electromagnetic radiation such as visible light, UV radiation or X-radiation, in particular UV radiation, and corpuscular radiation such as electron beams.

Radiation-curable binders are ones which can be cured by means of actinic radiation as defined above, in particular by means of UV radiation.

The present invention further provides surface coating formulations comprising the (meth)acrylated polyolefin waxes which are obtainable by the process of the invention. The (meth)acrylated polyolefin waxes can be used both in undercoats and in topcoats. Owing to their particular properties, e.g. the increase in the scratch resistance and elasticity, and also the decrease in the viscosity, in particular in the case of branched polyacrylates, of a radiation-cured clear coating, their use in topcoats is preferred.

Apart from the (meth)acrylated polyolefin waxes, a radiation-curable composition according to the invention can further comprise the following components:
(G) at least one polymerizable compound having a plurality of copolymerizable, ethylenically unsaturated groups,
(H) if appropriate, reactive diluents,
(I) if appropriate, photoinitiator and
(J) if appropriate, further additives typical of surface coatings.

As compounds (G), it is possible to use radiation-curable, free-radically polymerizable compounds having a plurality of, i.e. at least two, copolymerizable, ethylenically unsaturated groups.

Compounds (G) are preferably vinyl ether or (meth)acrylate compounds, in each case particularly preferably the acrylate compounds, i.e. the derivatives of acrylic acid.

Preferred vinyl ether and (meth)acrylate compounds (G) comprise from 2 to 20, preferably from 2 to 10 and very particularly preferably from 2 to 6, copolymerizable, ethylenically unsaturated double bonds.

Particular preference is given to compounds (G) which have a content of ethylenically unsaturated double bonds of 0.1-0.7 mol/100 g, very particularly preferably 0.2-0.6 mol/100 g.

The number-average molecular weight $M_n$ of the compounds (G) is, unless indicated otherwise, preferably less than 15 000 g/mol, particularly preferably 300-12 000 g/mol, very particularly preferably from 400 to 5000 g/mol and in particular 500-3000 g/mol (determined by means of gel permeation chromatography using polystyrene as standard and tetrahydrofuran as eluent).

(Meth)acrylate compounds which may be mentioned are (meth)acrylic esters and in particular acrylic esters and also vinyl ethers of polyfunctional alcohols, in particular alcohols comprising no further functional groups or at most ether groups in addition to the hydroxyl groups. Examples of such alcohols are bifunctional alcohols such as ethylene glycol, propylene glycol and their more highly condensed representatives, e.g. diethylene glycol, triethylene glycol, dipropylene glycol, tripropylene glycol etc., 1,2-, 1,3- or 1,4-butanediol, 1,5-pentanediol, 1,6-hexanediol, 3-methyl-1,5-pentanediol, neopentyl glycol, alkoxylated phenolic compounds such as ethoxylated and/or propoxylated bisphenols, 1,2-, 1,3- or 1,4- cyclohexanedimethanol, trifunctional and higher-functional alcohols such as glycerol, trimethyolpropane, butanetriol, trimethylolethane, pentaerythritol, ditrimethylolpropane, dipentaerythritol, sorbitol, mannitol and the corresponding alkoxylated, in particular ethoxylated and/or propoxylated alcohols.

The alkoxylation products can be obtained in a known manner by reacting the above alcohols with alkylene oxides, in particular ethylene oxide or propylene oxide. The degree of alkoxylation per hydroxyl group is preferably from 0 to 10, i.e. 1 mol of hydroxyl group can be alkoxylated by up to 10 mol of alkylene oxides.

Further (meth)acrylate compounds which may be mentioned are polyester (meth)acrylates, which are the (meth) acrylic esters or vinyl ethers of polyesterols, and urethane (meth)acrylates, epoxide (meth)acrylates or melamine (meth)acrylates.

Urethane (meth)acrylates are obtainable, for example, by reacting polyisocyanates with hydroxylalkyl (meth)acrylates and, if appropriate, chain extenders such as diols, polyols, diamines, polyamines or dithiols or polythiols.

The urethane (meth)acrylates preferably have a number average molecular weight $M_n$ of from 500 to 20 000 g/mol, in particular from 750 to 10 000 g/mol, particularly preferably from 750 to 3000 g/mol (determined by gel permeation chromatography using polystyrene as standard).

The urethane (meth)acrylates preferably have a content of from 1 to 5, particularly preferably from 2 to 4, mol of (meth) acrylic groups per 1000 g of urethane (meth)acrylate.

Epoxide (meth)acrylates are obtainable by reacting epoxides with (meth)acrylic acid. Possible epoxides are, for example, epoxidized olefins or glycidyl ethers, e.g. bisphenol A diglycidyl ether or aliphatic glycidyl ethers such as butanediol diglycidyl ether.

Melamine (meth)acrylates are obtainable by reacting melamine with (meth)acrylic acid or esters thereof.

The epoxide (meth)acrylates and melamine (meth)acrylates preferably have a number average molecular weight $M_n$ of from 500 to 20 000 g/mol, particularly preferably from 750 to 10 000 g/mol and very particularly preferably from 750 to 3000 g/mol; the content of (meth)acrylic groups is preferably from 1 to 5, particularly preferably from 2 to 4, per 1000 g of epoxide (meth)acrylate or melamine (meth)acrylate (determined by gel permeation chromatography using polystyrene as standard and tetrahydrofuran as eluent).

Further suitable (meth)acrylate compounds are carbonate (meth)acrylates which comprise an average of preferably from 1 to 5, in particular from 2 to 4, particularly preferably 2 or 3, (meth)acrylic groups and very particularly preferably 2 (meth)acrylic groups.

The number average molecular weight $M_n$ of the carbonate (meth)acrylates is preferably less than 3000 g/mol, particularly preferably less than 1500 g/mol, particularly preferably less than 800 g/mol (determined by gel permeation chromatography using polystyrene as standard, solvent: tetrahydrofuran).

The carbonate (meth)acrylates can be obtained in a simple manner by transesterification of carboxylic esters with polyhydric, preferably dihydric, alcohols (diols, e.g. hexanediol) and subsequent esterification of the free OH groups with (meth)acrylic acid or else transesterification with (meth) acrylic esters, as described, for example, in EP-A 92 269. They are also obtainable by reaction of phosgene, urea derivatives with polyhydric e.g. dihydric, alcohols.

As reactive diluents (compounds (H)), it is possible to use radiation-curable, free-radically or cationically polymerizable compounds having only one ethylenically unsaturated, copolymerizable group.

Mention may be made of, for example, $C_1$-$C_{20}$-alkyl (meth)acrylates, vinylaromatics having up to 20 carbon atoms, vinyl esters of carboxylic acids comprising up to 20 carbon atoms, ethylenically unsaturated nitriles, vinyl ethers of alcohols comprising from 1 to 10 carbon atoms, α,β-unsaturated carboxylic acids and anhydrides thereof and aliphatic hydrocarbons having from 2 to 8 carbon atoms and 1 or 2 double bonds.

As alkyl (meth)acrylates, preference is given to those having a $C_1$-$C_{10}$-alkyl radical, for example methyl methacrylate, methyl acrylate, n-butyl acrylate, ethyl acrylate and 2-ethylhexyl acrylate.

In particular, mixtures of alkyl (meth)acrylates are also suitable.

Vinyl esters of carboxylic acids having from 1 to 20 carbon atoms are, for example, vinyl laurate, vinyl stearate, vinyl propionate and vinyl acetate.

α,β-Unsaturated carboxylic acids and anhydrides thereof can be, for example, acrylic acid, methacrylic acid, fumaric acid, crotonic acid, itaconic acid, maleic acid or maleic anhydride, preferably acrylic acid.

Possible vinylaromatic compounds are, for example, vinyltoluene, α-butylstyrene, 4-n-butylstyrene, 4-n-decylstyrene and preferably styrene.

Examples of nitriles are acrylonitrile and methacrylonitrile.

Suitable vinyl ethers are, for example, vinyl methyl ether, vinyl isobutyl ether, vinyl hexyl ether and vinyl octyl ether.

As nonaromatic hydrocarbons having from 2 to 8 carbon atoms and one or two olefinic double bonds, mention may be made of butadiene, isoprene, and also ethylene, propylene and isobutylene.

Furthermore, it is possible to use N-vinylformamide, N-vinylpyrrolidone and N-vinyl-caprolactam.

As photoinitiators (I), it is possible to use photoinitiators known to those skilled in the art, e.g. those mentioned in "Advances in Polymer Science", Volume 14, Springer Berlin 1974 or in K. K. Dietliker, Chemistry and Technology of UV- and EB-Formulation for Coatings, Inks and Paints, Volume 3; Photoinitiators for Free Radical and Cationic Polymerization, P. K. T. Oldring (Eds), SITA Technology Ltd, London.

Possible photoinitiators are, for example, monoacylphosphine oxides or bisacylphosphine oxides Irgacure 819 (bis(2, 4,6-trimethylbenzoyl)phenylphosphine oxide), as described, for example, in EP-A 7 508, EP-A 57 474, DE-A 196 18 720, EP-A 495 751 or EP-A 615 980, for example 2,4,6-trimethylbenzoyidiphenylphosphine oxide (Lucirin® TPO), ethyl-2, 4,6-trimethylbenzoylphenylphosphinate, benzophenones, hydroxyacetophenones, phenylglyoxylic acid and derivatives thereof or mixtures of these photoinitiators. Examples which may be mentioned are benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-d iacetyl-benzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenon, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-di-isopropylthioxanthone, 2,4-di-chlorothioxanthone, benzoin, benzoin isobutyl ether, chlorooxanthenone, benzoin tetrahydropyranyl ether, benzoin methyl ether, benzoin ethyl ether, benzoin butyl ether, benzoin isopropyl ether, 7-H-benzoin methyl ether, benz[de]anthracen-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzyl ketals, such as benzyl dimethyl ketal, 2-methyl-1-[4-(methylthio)phenyl]-2-morpholinopropan-1-one, anthraquinones such as 2-methylanthraquinone, 2-ethylanthraquinone, 2-tert-butyl-anthraquinone, 1-chloroanthraquinone, 2-amylanthraquinone and 2,3-butanedione.

Also suitable are nonyellowing or only slightly yellowing photoinitiators of the phenylglyoxalic ester type, as described in DE-A 198 26 712, DE-A 199 13 353 or WO 98/33761.

Among the photoinitiators mentioned, preference is given to phosphine oxides, α-hydroxyketones and benzophenones.

In particular, it is also possible to use mixtures of various photoinitiators.

The photoinitiators can be used alone or in combination with a photopolymerization promoter, e.g. of the benzoic acid, amine or similar type.

As further additives typical of surface coatings (J), it is possible to use, for example, antioxidants, oxidation inhibitors, stabilizers, activators (accelerators), fillers, pigments, dyes, degassing aids, gloss agents, antistatic agents, flame retardants, thickeners, thixotropic agents, leveling agents, binders, antifoams, fragrances, surface-active agents, viscosity modifiers, plasticizers, tackifiers, chelate formers or compatibilizers.

Accelerators which can be used for thermal after-curing are, for example, tin octoate, zinc octoate, dibutyltin laurate or diaza[2.2.2]bicyclooctane.

Furthermore, one or more photochemically and/or thermally activatable initiators can be added, e.g. potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzpinacol, and also, for example, thermally activatable initiators which have a half life at 80° C. of more than 100 hours, e.g. di-t-butyl peroxide, cumene hydroperoxide, dicumyl peroxide, t-butylperbenzoate silylated pinacols, which are commercially available under the trade name ADDID 600 from Wacker or hydroxyl-containing amine N-oxides such as 2,2,6,6-tetramethylpiperidin-N-oxyl, 4-hydroxy-2,2,6,6-tetramethylpiperidin-N-oxyl, etc.

Further examples of suitable initiators are described in "Polymer Handbook", 2nd edition, Wiley & Sons, N.Y.

Thickeners which can be used are free-radically (co)polymerized (co)polymers and also customary organic and inorganic thickeners such as hydroxymethylcellulose or bentonites.

As chelate formers, it is possible to use, for example, ethylenediamineacetic acid and salts thereof and also β-diketones.

Suitable fillers comprise silicates, e.g. silicates obtainable by hydrolysis of silicon tetrachloride, for example Aerosil® from Degussa, diatomaceous earth, talc, aluminum silicates, magnesium silicates, calcium carbonates, etc.

Suitable stabilizers comprise typical UV absorbers such as oxanilides, triazines and benzotriazole (the latter obtainable as Tinuvin® grades from Ciba-Spezialitatenchemie) and benzophenones. These can be used either alone or together with suitable free-radical scavengers, for example sterically hindered amines such as 2,2,6,6-tetramethylpiperidine, 2,6-di-tert-butylpiperidine or derivates thereof, e.g. bis-(2,2,6,6-tetramethyl-4-piperidyl) sebacinate. Stabilizers are usually used in amounts of from 0.1 to 5.0% by weight, based on the solid components comprised in the preparation.

Further suitable stabilizers are, for example, N-oxyls, such as 4-hydroxy-2,2,6,6-tetramethylpiperidin-N-oxyl, 4-oxo-2,2,6,6-tetramethylpiperidin-N-oxyl, 4-acetoxy-2,2,6,6-tetramethylpiperidin-N-oxyl, 2,2,6,6-tetramethylpiperidin-N-oxyl, 4,4',4"-tris(2,2,6,6-tetramethylpiperidin-N-oxyl) phosphite or 3-oxo-2,2,5,5-tetramethylpyrrolidin-N-oxyl, phenols and naphthols, e.g. p-aminophenol, p-nitrosophenol, 2-tert-butylphenol, 4-tert-butylphenol, 2,4-di-tert-butylphenol, 2-methyl-4-tert-butylphenol, 4-methyl-2,6-tert-butylphenol (2,6-tert-butyl-p-cresol) or 4-tert-butyl-2,6-dimethylphenol, quinones such as hydroquinone or hydroquinone monomethyl ether, aromatic amines such as N,N-diphenylamine, N-nitrosodiphenylamine, phenylenediamines, such as N,N'-dialkyl-para-phenylenediamine, in which the alkyl radicals can be identical or different and each have, independently of one another, from 1 to 4 carbon atoms and may be linear or branched, hydroxylamines, such as N,N-diethyl-hydroxylamine, urea derivatives such as urea or thiourea, phosphorus-comprising compounds such as triphenylphosphine, triphenyl phosphite or triethyl phosphite or sulfur-comprising compounds such as diphenyl sulfide or phenothiazine.

Typical compositions of radiation-curable compositions are, for example:

(meth)acrylated polyolefin wax 20-100% by weight, preferably 40-90% by weight, particularly preferably 50-90% by weight and in particular 60-80% by weight, (G) 0-60% by weight, preferably 5-50% by weight, particularly preferably 10-40% by weight and in particular 10-30% by weight, (H) 0-50% by weight, preferably 540% by weight, particularly preferably 6-30% by weight and in particular 10-30% by weight, (I) 0-20% by weight, preferably 0.5-15% by weight, particularly preferably 1-10% by weight and in particular 2-5% by weight, and (J) 0-50% by weight, preferably 240% by weight, particularly preferably 3-30% by weight and in particular 5-20% by weight, with the proviso that the sum of (meth)acrylated polyolefin wax, (G), (H), (I) and (J) together is 100% by weight.

Coating of the substrates is carried out by customary methods known to those skilled in the art, with at least one coating composition being applied in the desired thickness to the substrate to be coated and any volatile constituents comprised in the coating composition being removed, if appropriate with heating. This procedure can, if desired, be repeated one or more times. Application to the substrate can be effected in a known manner, e.g. by spraying, application by means of a spatula, doctor blade coating, brushing, rolling, casting, lamination, backspraying or coextrusion. The coating thickness is generally in the range from about 3 to 1 000 g/m², preferably from 10 to 200 g/m².

Furthermore, a process for coating substrates, in which the coating composition is applied to the substrate and, if appropriate, dried, cured by means of electron beams or UV irradiation under an oxygen-comprising atmosphere or preferably under inert gas, if appropriate at temperatures up to the level of the drying temperature and subsequently treated thermally at temperatures up to 160° C., preferably in the range from 60 to 160° C., is disclosed.

The process for coating substrates can also be carried out by firstly treating the coating composition thermally at temperatures up to 160° C., preferably in the range from 60 to 160° C., after it has been applied and subsequently curing it by means of electron beams or UV irradiation under oxygen or preferably under inert gas.

The curing of the films formed on the substrate can, if desired, be effected exclusively thermally. However, the coatings are generally cured both by irradiation with high-energy radiation and thermally.

Curing can also be carried out, in addition to or instead of thermal curing, by means of NIR radiation. For the present purposes, NIR radiation is electromagnetic radiation in the wavelength range from 760 nm to 2.5 µm, preferably from 900 to 1500 nm.

If appropriate, if a plurality of layers of the coating composition are applied on top of one another, thermal, NIR and/or radiation curing can be carried out after each coating step.

As radiation sources for radiation curing, it is possible to use, for example, low-pressure mercury vapor lamps, medium-pressure mercury vapor lamps and high-pressure mercury vapor lamps and also fluorescent tubes, pulsed lamps, metal halide lamps, electronic flash devices by means of which radiation curing is possible without a photoinitiator, or excimer lamps. Radiation curing is carried out by action of high-energy radiation, i.e. UV radiation or daylight, preferably light in the wavelength range of $\lambda=200$ to 700 nm, particularly preferably $\lambda=200$ to 500 nm and very particularly preferably $\lambda=250$ to 400 nm, or by irradiation with high-energy electrons (electron beam; 150 to 300 keV). Radiation sources used are, for example, high-pressure mercury vapor lamps, lasers, pulsed lamps (flashlight), halogen lamps or excimer lamps. The radiation dose which is usually sufficient for crosslinking in the case of UV curing is in the range from 80 to 3000 mJ/cm$^2$.

Of course, it is also possible to use a plurality of radiation sources, e.g. from two to four, for curing.

These can also emit radiation in different wavelength ranges.

Irradiation can, if appropriate, also be carried out with exclusion of oxygen, e.g. under an inert gas atmosphere. Suitable inert gases are preferably nitrogen, noble gases, carbon dioxide or combustion gases. Furthermore, irradiation can be carried out with the coating composition covered with transparent media. Transparent media are, for example, polymer films, glass or liquids, e.g. water. Particular preference is given to carrying out irradiation in the manner described in DE-A1 199 57 900.

The invention further provides a process for coating substrates, in which
i) a substrate is coated with a coating composition as described above,
ii) volatile constituents of the coating composition are removed to form a film under conditions under which the photoinitiator (I) essentially does not yet form any free radicals,
iii) if appropriate, the film formed in step ii) is irradiated with high-energy radiation resulting in precuring of the film, and the article coated with the precured film is subsequently, if appropriate, mechanically formed or the surface of the precured film is brought into contact with another substrate,
iv) the film is finally cured thermally or by means of NIR radiation.

Here, steps iv) and iii) can also be carried out in the reverse order, i.e. the film can firstly be cured thermally or by means of NIR radiation and then by means of high-energy radiation.

Furthermore, substrates coated with a multilayer coating according to the invention are also provided by the present invention.

The coating compositions and paint and varnish formulations of the invention are particularly suitable for coating substrates such as wood, paper, textile, leather, nonwovens, plastic surfaces, glass, ceramic, mineral building materials such as molded cement bricks and fibrocement sheets, or metals or coated metals, preferably plastics or metals which can also be, for example, in the form of films or foils.

The thickness of such a layer to be cured as described can be from 0.1 µm to a number of mm, preferably from 1 to 2000 µm, particularly preferably from 5 to 1000 µm, very particularly preferably from 10 to 500 µm and in particular from 10 to 250 µm.

The (meth)acrylated polyolefin waxes prepared according to the invention can, owing to their lower color, also be used advantageously in a thermally induced (free-radical) (co)polymerization.

As monomers with which the (meth)acrylated polyolefin waxes of the invention can, for example, be copolymerized, mention may be made of, for example, $C_1$-$C_{20}$-alkyl (meth) acrylates, vinylaromatics having up to 20 carbon atoms, vinyl esters of carboxylic acids comprising up to 20 carbon atoms, ethylenically unsaturated nitriles, vinyl ethers of alcohols comprising from 1 to 10 carbon atoms and aliphatic hydrocarbons having from 2 to 8 carbon atoms and 1 or 2 double bonds.

As alkyl (meth)acrylates, preference is given to those having a $C_1$-$C_{10}$-alkyl radical, e.g. methyl methacrylate, methyl acrylate, n-butyl acrylate, ethyl acrylate and branched alkyl derivatives such as 2-ethylhexyl acrylate.

In particular, mixtures of alkyl (meth)acrylates are also suitable.

Vinyl esters of carboxylic acids having from 1 to 20 carbon atoms are, for example, vinyl laurate, vinyl stearate, vinyl propionate and vinyl acetate.

Possible vinylaromatic compounds are, for example, vinyltoluene, α-butylstyrene, 4-n-butylstyrene, 4-n-decylstyrene and preferably styrene.

Examples of nitriles are acrylonitrile and methacrylonitrile. Suitable vinyl ethers are, for example, vinyl methyl ether, vinyl isobutyl ether, vinyl hexyl ether and vinyl octyl ether.

As nonaromatic hydrocarbons having from 2 to 8 carbon atoms and 1 or 2 olefinic double bonds, mention may be made of butadiene, isoprene and also ethylene, propylene and isobutylene.

A frequent method, but not the only method, of preparing such (co)polymers is free-radical or ionic (co)polymerization in a solvent or diluent.

The free-radical (co)polymerization of such monomers is carried out, for example, in aqueous solution in the presence of polymerization initiators which disintegrate into free radicals under polymerization conditions, for example peroxodisulfates, $H_2O_2$-redox systems or hydroxyperoxides, such as tert-butyl hydroperoxide or cumene hydroperoxide. The (co)polymerization can be carried out in a wide temperature range, if appropriate under reduced or increased pressure, generally at temperatures up to 100° C. The pH of the reaction mixture is usually set to a value in the range from 4 to 10.

However, the (co)polymerization can also be carried out in other ways which are known to those skilled in the art, either continuously or batchwise, e.g. as a solution, precipitation, water-in-oil emulsion, inverse emulsion, suspension or reverse suspension polymerization.

Here, the monomer/monomers is/are (co)polymerized using free-radical polymerization initiators, for example azo compounds which disintegrate into free radicals, e.g. 2,2'-azobis(isobutyronitrile), 2,2'-azobis(2-amidinopropane) hydrochloride or 4,4'-azobis-(4'-cyanopentanoic acid), or dialkyl peroxides, such as di-tert-amyl peroxide, aryl alkyl peroxides such as tert-butyl cumyl peroxide, alkyl acyl peroxides, such as tert-butyl peroxy-2-ethylhexanoate, peroxydicarbonates, such as di(4-tert-butylcyclohexyl) peroxydicarbonate or hydroperoxides.

The compounds mentioned are usually used in the form of aqueous solutions or aqueous emulsions, with the lower concentration limit being determined by the amount of water which is acceptable in the (co)polymerization and the upper concentration limit being determined by the solubility of the respective compound in water.

Solvents or diluents which can be used are, for example, water, alcohols such as methanol, ethanol, n-propanol or isopropanol, n-butanol or isobutanol, or ketones such as acetone, ethyl methyl ketone, diethyl ketone or isobutyl methyl ketone. Particular preference is given to nonpolar solvents such as xylene and its isomer mixtures, Shellsol® A and solvent naphtha.

In a preferred embodiment, the monomers are premixed and initiator together with, if appropriate, further additives dissolved in solvents are added. A particularly preferred embodiment is described in WO 01/23484, in particular on page 10, line 3 to line 24.

The (co)polymerization can, if appropriate, be carried out in the presence of polymerization regulators such as hydroxylammonium salts, chlorinated hydrocarbons and thio compounds, e.g. tert-butyl mercaptan, ethylacryl thioglycolate, mercaptoethynol, mercaptopropyltrimethoxysilane, dodecyl mercaptan, tert-dodecylmercaptan or alkali metal hypophosphites. In the (co)polymerization, these regulators can be used, for example, in amounts of from 0 to 0.8 part by weight, based on 100 parts by weight of the monomers to be (co)polymerized, as a result of which the molar mass of the (co)polymer being formed is reduced.

In the emulsion polymerization, it is possible to use dispersants, ionic and/or nonionic emulsifiers and/or protective colloids or stabilizers as surface-active compounds. Possible compounds of this type are both the protective colloids customarily used for carrying out emulsion polymerizations and emulsifiers.

Suitable protective colloids are, for example, polyvinyl alcohols, cellulose derivatives or copolymers comprising vinylpyrrolidone. A comprehensive description of further suitable protective colloids may be found in Houben-Weyl, Methoden der organischen Chemie, volume XIV/1, Makromolekulare Stoffe, Georg-Thieme-Verlag, Stuttgart, 1969, pp. 411 to 420. Of course, it is also possible to use mixtures of emulsifiers and/or protective colloids. The dispersants used are preferably exclusively emulsifiers whose relative molecular weights are, in contrast to the protective colloids, usually less than 1000. They can be either anionic, cationic or nonanionic in nature. Of course, when mixtures of surface-active substances are used, the individual components have to be compatible with one another, which in the case of doubt can be checked by means of a few preliminary tests. In general, anionic emulsifiers are compatible with one another and with nonionic emulsifiers.

The same applies to cationic emulsifiers, while anionic and cationic emulsifiers are usually not compatible with one another. Emulsifiers which can be used are, for example, ethoxylated monoalkylphenols, dialkylphenols and trialkylphenols (EO content: 3 to 100,: $C_4$-$C_{12}$ alkyl radical), ethoxylated fatty alcohols (EO content: 3 to 100, alkyl radical: $C_8$-$C_{18}$), and also alkali metal and ammonium salts of alkyl sulfates (alkyl radical: $C_8$-$C_{16}$), of sulfuric monoesters of ethoxylated alkylphenols (EO content: 3 to 100, alkyl radical: $C_4$-$C_{12}$), of alkylsulfonic acids (alkyl radical: $C_{12}$-$C_{18}$) and of alkylacrylsulfonic acids (alkyl radical: $C_9$-$C_{18}$). Further suitable emulsifiers such as sulfosuccinic esters may be found in Houben-Weyl, Methoden der organischen Chemie, volume XIV/1, Makromolekulare Stoffe, Georg-Thieme Verlag, Stuttgart, 1961, pages 192 to 208.

In general, the amount of dispersants used is from 0.5 to 6% by weight, preferably from 1 to 3% by weight, based on the monomers to be free-radically polymerized.

Examples of (meth)acrylate-comprising dispersions are n-butyl acrylate/acrylonitrile dispersions, which are employed as adhesives, n-butyl acrylate/butadiene/styrene dispersions.

The polymer dispersions in which (meth)acrylated polyolefin waxes according to the invention are used can additionally be chemically and/or physically deodorized.

The copolymers obtainable using the (meth)acrylated polyolefin waxes of the invention generally have a lower color number, which is advantageous in the surface coatings field. The copolymers described can then be reacted in a manner known per se with, for example, aminoplastics such as melamine to give crosslinked coating resins, as described, for example, in EP 738740 or EP 675141.

The coating compositions of the invention are particularly suitable as or in exterior coatings, i.e. in applications in which they are exposed to daylight, preferably on buildings or parts of buildings, interior coatings, road markings, coatings on vehicles and aircraft. In particular, the coatings are used as wood, paper or plastics coatings, for example for parquetry floors or furniture.

The following examples illustrate the properties of the invention without restricting it.

EXAMPLE

In the present text, "parts" are, unless indicated otherwise, "parts by weight".

Abbreviations

HBVE: Hydroxybutyl vinyl ether

HEMA: Hydroxyethyl methacrylate

E: Ethylene

Novozym® 435: immobilized lipase from Candida antarctica Type B (from Novozymes, Denmark)

Example 1

Acrylated poly(ethylene-co-hydroxybutyl vinyl ether) Comprising 4.9 mol % of HBVE

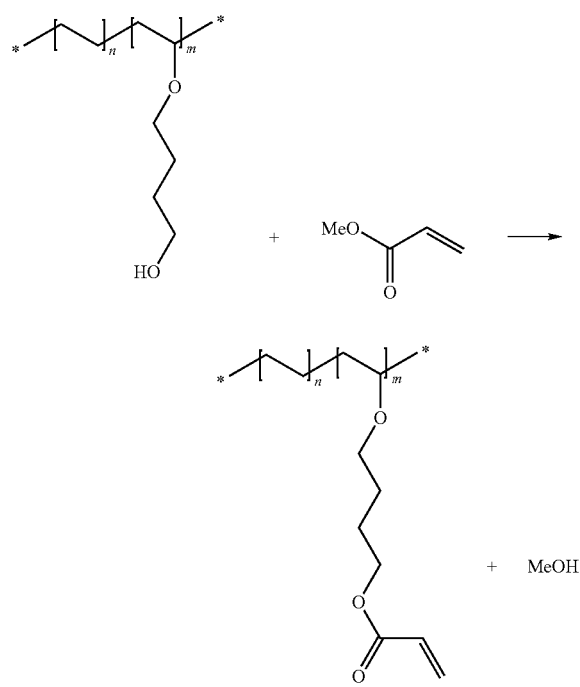

In a 1 l four-necked flask provided with superposed precision glass stirrer and reflux condenser, 100.0 g of poly(ethylene-co-HBVE), comprising 4.9 mol % of HBVE (OH number: 86 mg/g, corresponding to 154 mmol of OH groups), 500 ml of cyclohexane, 50.0 g of methyl acrylate (580 mmol), 5.0 g of Novozym® 435 and 20.0 g of molecular sieves (5 Å) were stirred at 60° C. for 24 hours. The turbid whitish solution was filtered hot through a suction filter and the residue on the filter was washed with cyclohexane. The filtrate was evaporated to dryness on a rotary evaporator at 60° C./6 mbar. This gave 112.3 g of colorless wax having an OH number of 24 mg/g, which corresponds to a degree of acrylation of the OH groups of 72%.

Example 2

Acrylated poly(ethylene-co-hydroxybutyl vinyl ether) Comprising 2.9-4.9 mol % of HBVE 5.0 g of poly(ethylene-co-HBVE) (see table), 5.0 g of methyl acrylate, 50 ml of solvent (toluene, cyclohexane or methyl acrylate; see table), 3.0 g of molecular sieves (5 Å) and 500 mg of Novozym® 435 were shaken in a screw-top bottle at 40° C. for 24 hours. After filtration, the degree of acrylation of the OH groups was determined via the OH number.

| HBVE content of the polymer [mol %] | Degree of acrylation [%] | | |
|---|---|---|---|
| | Toluene | Cyclohexane | Methyl acrylate |
| 2.9 | 61 | 68 | 52 |
| 3.8 | 70 | 74 | 54 |
| 4.9 | 80 | 85 | 71 |

Example 3

Acrylated poly(ethylene-co-hydroxybutyl vinyl ether) Comprising 2.9 mol % of HBVE 5.0 g of poly(ethylene-co-HBVE) comprising 2.9 mol % of HBVE (corresponding to 5.0 mmol of OH groups), 5.0 g of methyl acrylate (58 mmol), 50 ml of cyclohexane, 3.0 g of molecular sieves 5 Å and 500 mg of enzyme were shaken in a screw-top bottle at 40° C. on a waterbath for 24 hours. After filtration, the degree of acrylation was determined via the OH number.

| Immobilized enzymes | Degree of acrylation [%] |
|---|---|
| Lipase from Candida antarctica Type B | 68 |
| Lipase from Burkholderia sp. | 54 |
| Lipozyme from Mucor miehei | 50 |
| Lipozyme from Thermomyces lanuginosa | 39 |
| Lipase from Alcaligenes sp. | 38 |
| Lipase from Achromobacter sp. | 29 |
| Lipase from Candida antarctica Type A | 27 |
| Subtilisin from Bacillus licheniformis | 13 |

Example 4

Acrylated poly(ethylene-co-hydroxyethyl methacrylate) Comprising 10.7 mol % of HEMA a) Preparation of poly(ethylene-co-hydroxyethyl methacrylate)

The preparation of poly(ethylene-co-hydroxyethyl methacrylate) was carried out by free-radical polymerization of ethylene with HEMA in a stirred 1 liter high-pressure autoclave.

For this purpose, 12 kg/h of ethylene were firstly compressed to 260 bar in a first compressor in a continuous process. 3.71 liter/h of a solution of HEMA and toluene (1:1) and 2.4 liter/h of propionaldehyde as regulator to set the desired viscosities were fed into this intermediate-pressure zone. In a second compressor, this mixture was compressed to 1700 bar and fed into the high-pressure autoclave. The polymerization was initiated by addition of a solution of tert-butyl peroxypivalate in isododecane, which was likewise fed into the high-pressure autoclave at 1700 bar by means of a separate high-pressure pump. The polymerization temperature was 220° C. The ethylene copolymer having a viscosity (dynamic melt viscosity at 120° C.) of 60 mm$^2$/s and a molar mass $M_w$ of 1005 g/mol ($M_w/M_n$=2.75) was obtained as output at 4.2 kg/h. The molar mass distribution gave no indication of crosslinking of the OH groups with ester groups.

The composition of the ethylene copolymer according to $^1$H-NMR was 89.1 mol % (63.8% by weight) of copolymerized ethylene and 10.7 mol % (35.7% by weight) of copolymerized HEMA. A content of residual HEMA monomer of 0.2 mol % could be detected. The conversion of ethylene was 22%, and that of HEMA was 76%.

b) Acrylation of poly(ethylene-co-hydroxyethyl methacrylate)

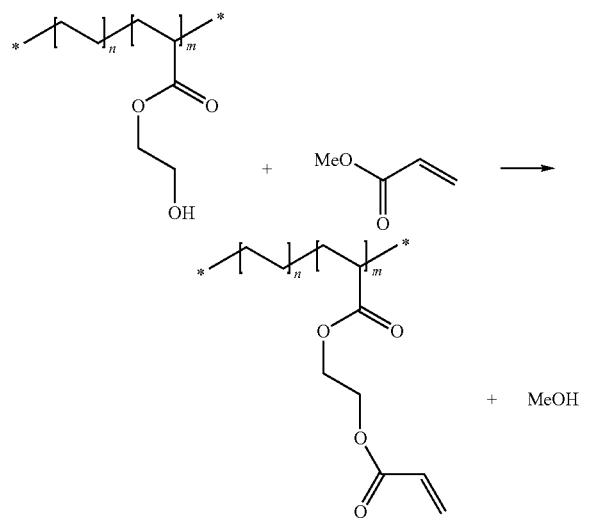

In a 500 ml four-necked flask provided with superposed precision glass stirrer and reflux condenser, 100.0 g of poly(ethylene-co-HEMA) comprising 10.7 mol % of HEMA (OH number: 158 mg/g, corresponding to 282 mmol of OH groups), 60.0 g of methyl acrylate (700 mmol), 12 mg of hydroquinone monomethyl ether (200 ppm), 6.0 g of Novozym® 435 and 60.0 g of molecular sieve powder (5 Å) was stirred at 60° C. for 8 or 24 hours. The turbid whitish solution was diluted with 300 ml of toluene to aid filtration, the enzyme was filtered off on a suction filter and washed with toluene. The filtrate was evaporated to dryness on a rotary evaporator at 60° C./10 mbar. This gave a colorless wax whose degree of acrylation was determined by means of the OH number.

| Experiment No. | Reaction time | OH number [mg/g] init. | OH number [mg/g] final | Conversion [%] | Weight of product [g] |
|---|---|---|---|---|---|
| 1 | 8 h | 160 | 6 | 96 | 107 |
| 2 | 24 h | 160 | 7 | 96 | 108 |

Example 5

Acrylated poly(ethylene-co-hydroxyethyl methacrylate) Comprising 7.9 mol % of HEMA of Differing Molar Mass Polymer 1: Poly(ethylene-co-hydroxyethyl methacrylate) comprising 28.5% by weight of HEMA (=7.9 mol %), OH number: 123 mg KOH/g and a viscosity of 60 mPas at 120° C.

Polymer 2: Poly(ethylene-co-hydroxyethyl methacrylate) comprising 28.5% by weight of HEMA (=7.9 mol %), OH number: 123 mg KOH/g and a viscosity of 1030 mPas at 120° C.

Polymer 2 has the same composition but a higher molar mass than polymer 1, which is shown by the higher viscosity.

5.0 g of polymer 1 or 2 (10.98 mmol of OH groups), 3.0 g of methyl acrylate (15.38 mmol), 10 ml of toluene, 100 mg of Novozym® 435 and 3.0 g of molecular sieve spheres 5 Å were shaken in a screw-top bottle at 60° C. on a waterbath for 1, 6 or 24 hours. A sample was filtered, the solvent and excess methyl acrylate were removed under reduced pressure and the product was characterized by means of H-NMR and the degree of acrylation was determined.

| | Degree of acrylation [%] | |
|---|---|---|
| Reaction time | Polymer 1 | Polymer 2 |
| 24 h | 49 | 66 |
| 6 h | 33 | 43 |
| 6 h without catalyst | 0 | 0 |
| 1 h | 23 | 20 |

Example 6

Acrylated poly(ethylene-co-hydroxyethyl methacrylate) Comprising 9.9 mol % of HEMA (Distillation Process)

Polymer 3: Poly(ethylene-co-hydroxyethyl methacrylate) Comprising 33.6% by Weight of HEMA (=9.99 mol %), OH Number: 151 mg KOH/g and a Viscosity of 60 mPas at 120° C In a round-bottomed flask, 20.0 g of polymer 3 (53.8 mmol of OH groups), 80 or 160 g of methyl acrylate (929 mmol), 1.0 g of Novozym® 435, 20 mg of hydroquinone monomethyl ether and 20 mg of butylhydroxyanisole were stirred at the temperatures indicated below and under reduced pressure for 8 hours. The azeotropic vapor mixture of methanol and methyl acrylate was passed via a glass tube into a reflux condenser and condensed. The condensate dripped over 30 g of molecular sieve 5A, which absorbs methanol, back into the reaction solution.

A sample was filtered, the product was characterized by means of H-NMR and the degree of acrylation was determined.

| Temperature/reduced pressure | Methyl acrylate | Conversion |
|---|---|---|
| 55° C. | 80 g | 83% |
| 40° C. | 160 g | 70% |
| 40° C. | 80 g | 71% |

The invention claimed is:

1. A process for preparing a (meth)acrylated polyolefin wax, said (meth)acrylated polyolefin wax comprising as monomer units:

from 75 to 99.9 mol % of at least one olefin without a further functional group, from 0.1 to 15 mol % of at least one alkenyloxyalkyl (meth)acrylate, at least one allyloxyalkyl (meth)acrylate, or a combination thereof, and from 0 to 25 mol % of at least one monomer having at least one functional group, or from 75 to 99.9 mol % of at least one olefin without a further functional group, and from 0.1 to 25 mol % of at least one (meth)acryloyloxyalkyl (meth)acrylate, at least one (meth)acryloyloxyalkyl (meth)acrylamide, or a combination thereof, and from 0 to 25 mol % of at least one monomer having at least one functional group, or from 75 to 99.9 mol % of at least one olefin without a further functional group, from 0.1 to 15 mol % of at least one alkenyloxyalkyl (meth)acrylate, at least one allyloxyalkyl (meth)acrylate, or a combination thereof, from 0.1 to 25 mol % of at least one (meth)acryloyloxyalkyl (meth)acrylate, at least one (meth)acryloyloxyalkyl (meth)acrylamide, or a combination thereof, and from 0 to 25 mol % of at least one monomer having at least one functional group, in each case in polymerized form, and said process comprising:

copolymerizing said at least one olefin without a further functional group, at least one hydroxyalkyl alkenyl ether, at least one hydroxyalkyl allyl ether, or a combination thereof, and optionally said at least one monomer having at least one functional group;

or said at least one olefin without a further functional group, at least one hydroxyalkyl (meth)acrylate, at least one hydroxyalkyl (meth)acrylamide, or a combination thereof, and optionally at least one monomer having at least one functional group;

or said at least one olefin without a further functional group, at least one hydroxyalkyl alkenyl ether, at least one hydroxyalkyl allyl ether, or a combination thereof, at least one hydroxyalkyl (meth)acrylate, at least one hydroxyalkyl (meth)acrylamide, or a combination thereof, and optionally at least one monomer having at least one functional group;

to obtain a polyolefin wax containing pendent hydroxy groups; and:

a) esterifying 10 to 80% of the hydroxy groups of said polyyolefin wax obtained from said copolymerizing with (meth)acrylic acid in the presence of at least one enzyme, b) transesterfying 10 to 80% of the hydroxy groups of said polyolefin wax obtained from said copolymerizing with (meth)acrylic ester in the presence of at least one enzyme, or c) a combination thereof, wherein said at least one monomer having at least one functional group is a different monomer than said at least one olefin without a further functional group, said at least one alkenyloxyalkyl (meth)acrylate, and said at least one allyloxyalkyl (meth)acrylate.

2. The process according to claim 1, wherein said at least one olefin without a further functional group is selected from the group consisting of ethylene, propylene, 1-butene, 2-butene, isobutene, 1-pentene, 2-pentene, 1-hexene, 1-octene, a polyisobutene having a number average molecular weight $M_n$ of from 100 to 1000 dalton, cyclopentene, cyclohexene, butadiene, isoprene and styrene.

3. The process according to claim 1, wherein
said hydroxyalkyl alkenyl ether is represented by formula (IV)

and said hydroxyalkyl allyl ether is represented by formula (IV')

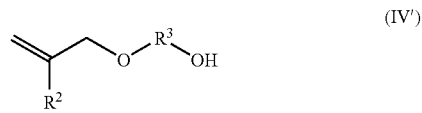

where $R^2$ is hydrogen or methyl and
$R^3$ is $C_2$-$C_{20}$-alkylene aryl-, alkyl-, aryloxy-, alkyloxy-, heteroatom-substituted $C_2$-$C_{20}$-alkylene, heterocycle-substituted $C_2$-$C_{20}$-alkylene, heteroatom and heterocycle-substituted $C_2$-$C_{20}$-alkylene, $C_5$-$C_{12}$cycloalkylene, $C_6$-$C_{12}$-arylene, or a $C_2$-$C_{20}$-alkylene interrupted by one or more oxygen atoms, one or more sulfur atoms, one or more substituted imino group, one or more unsubstituted imino groups, one or more cycloalkyl, —(CO)—, —O(CO)O—, —(NH)(CO)O—, —O(CO)(NH)—, —O(CO)— or —(CO)O— groups, or a combination thereof.

4. The process according to claim 1, wherein
said hydroxyalkyl (meth)acrylate is represented by formula (V)

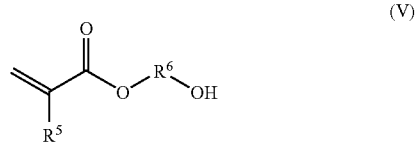

and said hydroxyalkyl (meth)acrylamide is represented by formula (v')

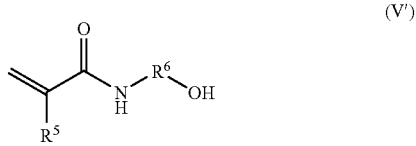

where $R^5$ is hydrogen or methyl and
$R^6$ is $C_2$-$C_{20}$-alkylene aryl-, alkyl, aryloxy-, alkyloxy-, heteroatom-substituted $C_2$-$C_{20}$-alkylene, heterocycle-substituted $C_2$-$C_{20}$-alkylene, heteroatom and heterocycle-substituted $C_2$-$C_{20}$-alkylene, $C_5C_{12}$-cycloalkylene, $C_6$-$C_{12}$-arylene, or a $C_2$-$C_{20}$-alkylene interrupted by one or more oxygen atoms, one or more sulfur atoms, one or more substituted imino group, one or more unsubstituted imino groups, one or more cycloalkyl, —(CO)—, —O(CO)O—, —(NH)(CO)O—, —O(CO)(NH)—, —O(CO)— or —(CO)O— groups, or a combination thereof.

5. The process according to claim 1, wherein said at least one monomer having at least one functional group is selected from the group consisting of a $C_1$-$C_{20}$-alkyl (meth)acrylate, a vinyl ester of a carboxylic acid comprising up to 20 carbon atoms, an ethylenically unsaturated nitrile, a vinyl ether of an alcohol comprising from 1 to 10 carbon atoms, an α,β-unsaturated carboxylic acid, an anhydride of said α,β-unsaturated carboxylic acid.

6. The process according to claim 1, wherein said copolymerizing is carried out in the presence of at least one polymerization inhibitor at 0 100°C. and a reaction time of from 1 to 72 hours.

7. A (meth)acrylated polyolefin wax obtained by the process according to claim 1, in the form of a dispersant for a pigment, a lubricants, a matting agent for surface coatings, a surface-active agent for printing inks, a leather coating, a textile coating or a radiation-curable coating composition, or a thermally curable coating composition.

8. A coating composition comprising the (meth)acrylated polyolefin wax according to claim 1 and:
at least one polymerizable compound having a plurality of copolymerizable, ethylenically unsaturated groups.

9. The coating composition according to claim 8, further comprising at least one of
at least one reactive diluent,
at least one photoinitiator, and
at least one additive selected from the group consisting of an antioxidant, an oxidation inhibitor, a stabilizers, an activators, a filler, a pigment, a dye, a degassing aid, a gloss agent, an antistatic agent, a flame retardant, a thickener, a thixotropic agent, a leveling agent, a binder, an antifoam agent, a fragrance, a surface-active agent, a viscosity modifier, a plasticizer, a tackifier, a chelate former, and a compatibilizer.

10. The process according to claim 1, wherein said copolymerization takes place at a pressure of from 500 to 4000 bar.

11. The process according to claim 1, wherein said copolymerization is initiated in the presence of at least one free-radical peroxide initiator selected from the group consisting of didecanoyl peroxide; 2,5-dimethyl-2,5-di(2-ethylhexanoylperoxy)hexane; tert-amyl peroxy-2-ethylhexanoate; tert-amyl peroxypivalate; dibenzoyl peroxide; tert-butyl peroxy-2-ethylhexanoate; tert-butylperoxydiethyl acetate; tert-butyl peroxydiethylisobutyrate; -1,4-di(tert-butylperoxycarbo)cyclohexane; tert-butyl perisononanoate 1,1-di(tert-butyl-peroxy)-3,3,5-trimethylcyclohexane; 1,1-di(tert-butylperoxy)cyclohexane; methyl isobutyl ketone peroxide; tert-butyl peroxyisopropylcarbonate; 2,2-di-tert-butylperoxybutane; tert-butyl peroxyacetate; tert-butylperoxybenzoate; di-tert-amyl peroxide; dicumyl peroxide; di(tert-butylperoxyisopropyl)benzene; 2,5-dimethyl-2,5-di-tert-butylperoxyhexane; tert-butyl cumyl peroxide; 2,5-dimethyl-2,5-di(tert-butylperoxy)hex-3-yne; di-tert-butyl peroxide; 1,3-diisopropyl monohydroperoxide; cumene hydroperoxide; tert-butylhydroperoxide; a dimeric ketone peroxide; and a trimeric ketone peroxide.

12. The process according to claim 1, wherein said copolymerization takes place in the presence of at least one solvent selected from the group consisting of toluene; o-xylene; m-xylene; p-xylene; a trimethylbenzene; a tetramethylbenzene; ethylbenzene; cumene; and tetrahydronaphthalene.

13. The process according to claim 3, wherein said hydroxyalkyl alkenyl ether represented by formula (IV) is at least one member selected from the group consisting of 2-hydroxyethyl vinyl ether; 2-hydroxypropyl vinyl ether; 3-hydroxypropyl vinyl ether; 4-hydroxybutyl vinyl ether; and 6-hydroxyhexyl vinyl ether.

14. The process according to claim 3, wherein said hydroxyalkyl allyl ether is represented by formula (Iv') is at least one member selected from the group consisting of ethylene glycol monoallyl ether; polyethylene glycol monoallyl ether; 4-hydroxybutyl allyl ether; 6-hydroxyhexyl allyl ether; diethylene glycol monoallyl ether; propylene glycol monoallyl ether; dipropylene glycol monoallyl ether; 1,3-propanediol monoallyl ether; glycerol monoallyl ether; and trimethyloipropane monoallyl ether.

15. The process according to claim 4, wherein said hydroxyalkyl (meth)acrylate represented by formula (V) is at least one member selected from the group consisting of 2-hydroxyethyl (meth)acrylate; 2-hydroxypropyl (meth)acrylate; 3-hydroxypropyl (meth)acrylate; 2-hydroxybut-1-yl (meth)acrylate; 4-hydroxybut-1-yl (meth)acrylate; 3-hydroxybut-1-yl (meth)acrylate; 6-hydroxyhex-1-yl (meth)acrylate; 8-hydroxyoct-1-yl (meth)acrylate; 3-hydroxy-2,2-dimethylpropyl (meth)acrylate; 2-ethyl-3-hydroxyhex-1-yl (meth)acrylate; 2,4-diethyl-5-hydroxy-oct-1-yl (meth)acrylate; trimethylolpropane mono(meth)acrylate; pentaerythritol mono(meth)acrylate; glycerol mono(meth)acrylate; polypropylene glycol mono(meth)acrylate; and polyethylene glycol mono(meth)acrylate.

16. The process according to claim 4, wherein said hydroxyalkyl (meth)acrylamide represented by formula (V') is at least one member selected from the group consisting of
N-methylolmethacrylamide (N-(hydroxymethyl)methacrylamide); and
N-(hydroxymethyl)methacrylamide.

17. The process according to claim 1, wherein said at least one enzyme is at least one member selected from the group consisting of an esterase, a lipase, a glycosylase, and a protease.

18. The process according to claim 1, wherein said at least one enzyme is at least one member selected from the group consisting of Novozyme ® 435 , a lipase from *Alcaligenes* sp., a lipase from *Aspergillus* sp. , a lipase from *Mucor* sp., a lipase from *Penicilium* sp., a lipase from *Geotricum* sp., a lipase from *Rhizopus* sp., a lipase from *Burkholderia* sp., a lipase from *Candida* sp., a lipase from *Pseudomonas* sp., a lipase from *Thermomyces* sp., a lipase from pig pancreas, a lipase from *Candida antarctica B*, and a lipase from *Burkholderia* sp.

19. The process according to claim 1, wherein said at least one enzyme is present in an amount of from about 0.1 to 10% by weight, relative to the mass of the polyolefin wax containing pendent hydroxy groups.

20. The process according to claim 1, comprising:
esterifying 40 to 50% of the hydroxy groups of said polyolefin wax obtained from said copolymerizing with (meth)acrylic acid in the presence of at least one enzyme,
transesterfying 40 to 50% of the hydroxy groups of said polyolefin wax obtained from said copolymerizing with (meth)acrylic ester in the presence of at least one enzyme, or
a combination thereof.

* * * * *